(12) United States Patent
Hall et al.

(10) Patent No.: US 9,588,580 B2
(45) Date of Patent: Mar. 7, 2017

(54) SYSTEM AND METHOD FOR SINGLE DOMAIN AND MULTI-DOMAIN DECISION AID FOR PRODUCT ON THE WEB

(71) Applicant: DEJOTO TECHNOLOGIES LLC, Rockport, ME (US)

(72) Inventors: Debra J. Hall, Naples, FL (US); Anthony G. Lombardo, Naples, FL (US)

(73) Assignee: DEJOTO TECHNOLOGIES LLC, Rockport, ME (US)

( * ) Notice: Subject to any disclaimer, the term of this patent is extended or adjusted under 35 U.S.C. 154(b) by 1104 days.

(21) Appl. No.: 13/632,811

(22) Filed: Oct. 1, 2012

(65) Prior Publication Data

US 2014/0096035 A1 Apr. 3, 2014
US 2015/0153824 A9 Jun. 4, 2015

Related U.S. Application Data

(60) Provisional application No. 61/541,345, filed on Sep. 30, 2011.

(51) Int. Cl.
*G06F 15/18* (2006.01)
*G06F 3/01* (2006.01)
(Continued)

(52) U.S. Cl.
CPC ............ *G06F 3/01* (2013.01); *G06Q 30/02* (2013.01); *G06Q 30/0631* (2013.01); *G06Q 50/01* (2013.01)

(58) Field of Classification Search
None
See application file for complete search history.

(56) References Cited

U.S. PATENT DOCUMENTS 6,012,051 A 1/2000 Sammon, Jr. et al.
7,761,345 B1 7/2010 Martin et al.
(Continued)

FOREIGN PATENT DOCUMENTS

EP 1648142 A1 4/2006

OTHER PUBLICATIONS

European Search Report from EP Application No. 12835351.3 dated Mar. 12, 2015.
(Continued)

*Primary Examiner* — Li-Wu Chang
(74) *Attorney, Agent, or Firm* — DLA Piper LLP; Jennifer Lacroix

(57) ABSTRACT

A system and method for problem solving in multiple domains on the web is provided. Two facets of preference are applied regardless of domain: first, criteria selected by the user which indicates which elements relate to the user, and second, level of importance to the user. For each decision aid that the user saves to his/her member account, a series of methods applied thereto assist the user in making decisions through intelligent agent expertise, as well as through related eCommerce, social networking, guided content search and delivery of context-rich content. Relevancy of results is also calculated. Depending on characteristics inherent in a particular domain, one of two primary methods is employed. The Multi-Product method uses ontology and a neural network engine to reveal the subset of relevant results based on any combination of user inputs, implicitly and explicitly derived. The Single-Product method maps inputs to results using sub-category analysis of fit and then applies user-centric filters and discounting rules to return meaningful coaching and relevancy of results.

6 Claims, 39 Drawing Sheets

(51) Int. Cl.
*G06Q 30/02* (2012.01)
*G06Q 30/06* (2012.01)
*G06Q 50/00* (2012.01)

(56) References Cited

U.S. PATENT DOCUMENTS

| | | | |
|---|---|---|---|
| 8,166,026 B1* | 4/2012 | Sadler | G06F 17/30867 707/722 |
| 2001/0029473 A1 | 10/2001 | Yamaoka et al. | |
| 2002/0052774 A1 | 5/2002 | Parker | |
| 2005/0209987 A1 | 9/2005 | Beres et al. | |
| 2006/0047807 A1 | 3/2006 | Magnaghi et al. | |
| 2008/0059455 A1* | 3/2008 | Canoy | G06F 17/30867 |
| 2011/0047245 A1 | 2/2011 | Abramson et al. | |
| 2011/0143811 A1* | 6/2011 | Rodriguez | G06K 9/00986 455/556.1 |

OTHER PUBLICATIONS

International Preliminary Report on Patentability from PCT/US2012/058328 dated Apr. 1, 2014.
International Search Report from PCT/US2013/058328 Written Opinion of the International Search Authority dated Feb. 1, 2013.

* cited by examiner

| SATISFY WANTS & NEEDS | MARKET LINKS |
|---|---|

MOST RELEVANT RESULTS FOR YOUR WANTS & NEEDS

THE PLAZA HEALTH SERVICES AT
8502 EDGEMERE
DALLAS, TX 75225 • 214-615-7073

CARUTH HAVEN COURT
5585 CARUTH HAVEN LANE
DALLAS, TX 75225 • 214-368-8545

HORIZON BAY RETIREMENT LIVIN
2500 WOODSIDE DRIVE
ARLINGTON, TX 76016 • 817-457-97

RELEVANT RESULTS FOR YOUR W

EMERITUS AT LAKE HIGHLANDS
9715 PLANO ROAD
DALLAS, TX 75238 • 214-343-7445

WALNUT PLACE
5515 GLEN LAKES DRIVE
DALLAS, TX 75231 • 214-361-8923

OF INTEREST

NEEDS

BENTLEY MANOR ASSISTED LIVIN
  3344 FOREST LANE, DALLAS TX
  972-247-2266
  *ASSISTED LIVING*

GRACE PRESBYTERIAN VILLAGE
  550 EAST ANN ARBOR AVE, DAL
  214-376-1701
  *ASSISTED LIVING, MEMORY CA*

— 1405

---

HORIZON BAY
2500 WOODSIDE DRIVE
ARLINGTON, TX 76016
817-457-9710
WWW.HORIZONBAY.COM

[SEE PHOTOS & MORE!]

WOODSIDE DR

— 1407

OWNERSHIP
BROOKDALE SENIOR LIVING

TYPES OF CARE & LIVING OFFERED
ASSISTED LIVING
INDEPENDENT LIVING
RESPITE
MEMORY CARE

FACILITY HIGHLIGHTS
CONVENIENTLY LOCATED IN THE DALLAS. FORT WORTH
METRO AREA. JUST MINUTES FROM THE MEDICAL
CENTER OF ARLINGTON MEMORIAL HOSPITAL.
SURROUNDED BY SHOPPING AND ENTERTAINMENT.

SETTING
*PROPERTY*
  SUBURBAN
*ARCHITECTURE*
  CONDO STYLE
*SECURITY*
  24 HR SECURITY PERSONNEL

LIVING SPACE
*UNIT SIZE*
  1 BEDROOM
  STUDIO
*UNIT FEATURES*
  LIMITED OR NO KITCHEN
  CENTRAL AIR

LIFE STYLE
*DINING*
  ANYTIME DINING
  SPECIAL DIETS

PRODUCT FAMILY COUNTS

| RP | # TRUE | COUNT | IN FAMILY |
|---|---|---|---|
| $P_3$ | 1 | 1 | $F_7$ |
| $P_{24}$ | 2 | 1 | $F_{12}$ |
| $P_{35}$ | 1 | 1 | $F_4$ |
| $P_{46}$ | 1 | 1 | $F_7$ |
| $P_{81}$ | 1 | 1 | $F_9$ |
| $P_{121}$ | 3 | 1 | $F_7$ |
| $P_{124}$ | 1 | 1 | $F_4$ |
| $P_{168}$ | 1 | 1 | $F_{11}$ |
| $P_{192}$ | 1 | 1 | $F_9$ |
| $P_{207}$ | 1 | 1 | $F_7$ |
| $P_{215}$ | 1 | 1 | $F_8$ |

FAMILY COUNT IN DESCENDING ORDER OF OCCURRENCE, IS CALCULATED AS:

$F_7$ - 4   $P_3$   $P_{46}$   $P_{121}$   $P_{207}$
$F_4$ - 2   $P_{35}$   $P_{124}$
$F_9$ - 2   $P_{81}$   $P_{192}$
$F_{12}$ - 1   $P_{24}$
$F_{11}$ - 1   $P_{168}$
$F_8$ - 1   $P_{215}$

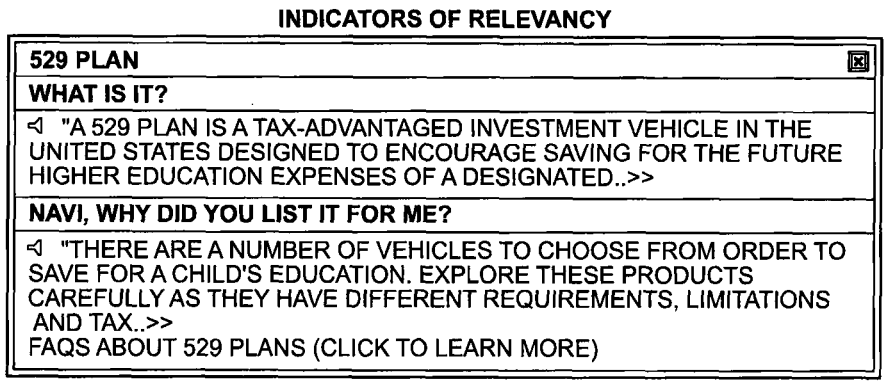

FIG. 6

SELF-LEARNING BEHAVIORS

*LEARN TO IGNORE*
NO LONGER POST LINKS, FEEDBACK FOR USER K THAT IS IGNORED BY USER K, OR BY PERSONA-TYPE EQUIVALENT TO USER K.
FOR USER K, NO LONGER POINT TO PRODUCTS & SERVICES OF PROVIDER Y THAT ARE INFREQUENTLY ACCESSED BY PERSONA-TYPE EQUIVALENT TO USER K.

*LEARN TO APPEND*
POST HIGHER FREQUENCY OF LINKS AND FEEDBACK FOR USER K THAT IS ACCESSED REGULARLY BY PERSONA-TYPE EQUIVALENT TO USER K.
IDENTIFY $3^{RD}$ PARTY EXPERT ARTICLES AND LINKS FOR USER K BASED ON ATTRIBUTES OF EXISTING LINKS AND USAGE OF ARTICLES/LINKS BY USER K, OR BY PERSONAL-TYPE EQUIVALENT TO USER K.

*LEARN TO BEFRIEND*
ADOPT CADENCE FOR USER K THAT USER K RESPONDS TO WITH HIGHEST FREQUENCY, OR THAT PERSONA-TYPE EQUIVALENT TO USER K RESPONDS TO WITH HIGHEST FREQUENCY.

*LEARN TO SUGGEST*
SUGGEST A GOAL/ATTRIBUTE TO USER K THAT IS COMMONLY SELECTED BY PERSONA-TYPE EQUIVALENT TO USER K. SUGGEST A PRODUCT/SERVICE TO USER K THAT, ALTHOUGH NOT LINKED TO A GOAL/ATTRIBUTE OF USER K, IS COMMONLY SELECTED BY PERSONA-TYPE EQUIVALENT TO USER K.

*LEARN TO REFINE*
FOR USER K, REDUCE AMOUNT OF INTELLIGENT FEEDBACK AND LINKS BASED ON A COMBINATION OF USER K, AND PERSONA-TYPE EQUIVALENT TO USER K, ACCESS BEHAVIOR.

*LEARN TO BE CURRENT*
RENEW ATTENTION TO PRODUCTS AND SERVICES RELEVANT TO USER K, BASED ON CONDITION THAT PRODUCTS AND SERVICES ARE ENJOYING SURGE IN WEB TOPICALITY.

FIG. 7

| MATRIX | SIZE | EXECUTED | INPUT MATRIX | PURPOSE |
|---|---|---|---|---|
| PRP | MxN | OFFLINE | N/A | MAP UNIVERSE OF PRODUCTS TO UNIVERSE OF GOALS |
| PML | MxN | OFFLINE | N/A | MAP UNIVERSE OF CONSUMER RETAIL PRODUCTS TO UNIVERSE OF GOALS |
| RP | MxN | RUNTIME | PRP | MAP OF PRODUCTS SPECIFIC TO USER-SPECIFIED GOALS |
| RML | MxN | RUNTIME | PML | MAP OF CONSUMER RETAIL PRODUCTS TO USER-SPECIFIED GOALS |

MINIMUM & MAXIMUM IDENTIFIERS

|  | SUPER CLASS | CLASS | SUBCLASS | INTENTION | ATTRIBUTE | SUB-ATTRIBUTE |
|---|---|---|---|---|---|---|
| PRODUCTS | 1..M | 1..M | 1..M | 1..M | 1..M | 1..M |
| GOALS | 0..1 | 0..1 | 0..1 | 1 | 1 | 0..1 |

CONDITION

1. $G_1 \Rightarrow P_1$
2. $G_2 \Rightarrow P_1$   } THESE 3 CONDITIONS MAY BE LOGICALLY REPRESENTED AS: $G_1 \wedge G_2 \wedge G_3 \Rightarrow P_1$
3. $G_3 \Rightarrow P_1$
4. $G_1 \wedge G_2 \Rightarrow P_1$
5. $G_1 \wedge G_3 \Rightarrow P_1$
6. $G_1 \wedge G_2 \wedge G_3 \Rightarrow P_1$
7. $G_2 \wedge G_3 \Rightarrow P_1$

0 - NO STATEMENTS    THIS EIGHTH BINARY RESULT OF 0 IS DISIMISSED

FIG. 16

VARIATION    STATEMENT (DISPLAY VARIATIONS OF FEEDBACK, SUCH AS FOLLOWS)

1. YOU HAVE INDICATED THE DESIRE TO <GOAL 1>, AS WELL AS <GOAL2>. SINCE THESE GOALS ARE CONTRADICTORY, I SUGGEST YOU UNCHECK THE ONE OF LEAST IMPORTANCE TO YOU.

2. YOU WILL RECEIVE THE MOST MEANINGFUL RESULTS BY REMOVING OPPOSING GOALS. I RECOMMEND THAT YOU UNCHECK ONE OF THE FOLLOWING: <GOAL 1>, OR <GOAL 2>.

3. TO AVOID RECEIVING CONTRADICTORY RESULTS, CONSIDER UN-CHECKING ONE OF THE FOLLOWING GOALS: <GOAL 1>, OR <GOAL 2>.

4. ON FIRST CONSIDERATION, WE SOMETIMES STATE OPPOSING GOALS. I ENCOURAGE YOU TO RECONSIDER YOUR STATED DESIRE TO <GOAL 1>, AS WELL AS <GOAL 2>. UNCHECK THE ONE OF LEAST IMPORTANCE.

5. WHEN DESIRED GOALS ARE CONTRADICTORY IN NATURE, THEY LEAD TO LESS-MEANINGFUL RESULTS. UNCHECK ONE OF THE FOLLOWING TO IMPROVE YOUR RESULTS: <GOAL 1>, OR <GOAL 2>.

FIG. 17

ALGORITHMIC DISPLAY FOR CONNECT USERS

| | | VALUE | UNDERLYING CRITERIA | | |
|---|---|---|---|---|---|
| OVERLAY 86% | POSITION | 1 2 3 4 | 1 2 3 4 5 6 7 8 9 10 11 12 | | |
| | W1 | 0 1 0 1 0 0 0 0 | 0 1 0 0 0 0 0 1 0 1 0 0 | 0 0 0 0 0 0 0 0 | 0 0 0 0 0 0 0 0 |
| | W2 | 1 0 0 0 0 1 0 1 | 0 0 0 1 1 1 0 0 0 0 0 0 | 0 0 0 0 0 0 0 0 | 0 0 0 0 0 0 0 0 |
| | W3 | 0 0 1 0 1 0 1 0 | 0 0 0 1 1 0 0 0 0 0 0 0 | 0 0 0 0 0 0 0 0 | 0 0 0 0 0 0 0 0 |
| 2801 | W4 | 0 0 0 1 0 1 0 1 | 1 0 0 1 0 1 1 0 0 0 0 0 | 1 0 0 0 0 0 0 0 | 0.67 |
| | N1 | | 0 0 0 1 1 0 0 0 1 0 0 0 | 0 0 0 0 1 0 0 0 | 0.67 |
| | N2 | | 1 0 0 0 0 0 1 0 1 0 0 0 | 1 0 0 0 0 0 0 0 | 1 |
| | N3 | | 1 0 0 0 0 0 0 0 1 0 1 0 | 1 0 0 0 0 0 1 0 | 0.75 |
| | N4 | | 0 0 0 0 0 0 0 0 0 1 0 0 | 0 0 0 0 0 0 0 0 | 0.83 2804 |

(reproduction of figure data — see figure)

FIG. 18

USER STATED IMPORTANCE
*FORMULA INTENT:*
- CALCULATE AN INTEGER VALUE TO REPRESENT THE USER'S STATED IMPORTANCE FOR EACH CATEGORY, WHERE 0 IS "NOT IMPORTANT", 1 AND 2 ARE "LESS IMPORTANT", AND 3 AND ABOVE ARE "MORE IMPORTANT".
- DISPLAY TEXT OR GRAPHIC INDICATING LEVEL OF IMPORTANCE FOR EACH CATEGORY.

*INSTANCES OF FORMULA:*
   8 PER DOMAIN, WITHOUT EXCEPTION

*PSEUDOCODE FORMULA:*
   FOR EACH CATEGORY 1 TO M,

FOR CRITERIA 1 TO N,

ASSIGN EACH ASSIGNED LESS IMPORTANT VALUE OF .5

ASSIGN EACH ASSIGNED MORE IMPORTANT VALUE OF 1.0

UNASSIGNED CRITERIA RETAIN VALUE OF 0

CALCULATE SUM OF ALL LESS IMPORTANT AND MORE IMPORTANT

DIVIDE THAT SUM BY (N * .25)

ROUND DOWN VALUE TO INTEGER

IF INTEGER VALUE = 0

ASSIGN "NOT IMPORTANT" TO CATEGORY

ELSE IF INTEGER VALUE IS 1 OR 2

ASSIGN "LESS IMPORTANT" TO CATEGORY

ELSE

ASSIGN "MORE IMPORTANT" TO CATEGORY

{VALUE OF 0 IS "NOT IMPORTANT"}
{ROUNDED VALUES OF 1 AND 2 ARE "OVERALL LESS IMPORTANT"}
{ROUNDED VALUES OF 3 AND ABOVE ARE "OVERALL MORE IMPORTANT"}
{ROUND DOWN PRODUCES HIGHER RATE OF LESS IMPORTANT; ROUND UP PRODUCES HIGHER RATE OF MORE IMPORTANT; ROUNDING TO BE SET ADMINISTRATIVELY}
{IF ONE CRITERION IS "MORE IMPORTANT," BUT NO OTHERS ARE CHECKED, THEN "LESS IMPORTANT" MAY RESULT, DEPENDING ON THE NUMBER OF CRITERION (N)}

FIG. 19

INTELLIGENT AGENT COACHING TO RETHINK CRITERIA IMPORTANCE

*FORMULA INTENT:*
- PROVIDE FEEDBACK TO USER WHEN MAJORITY OF CATEGORIES ARE EITHER "LESS IMPORTANT OR NOT IMPORTANT" OR ARE "MORE IMPORTANT".
- TWO FORMULAS APPEAR BELOW, EACH CHECKING-FOR AND RESPONDING-TO ONE OF THE CONDITIONS ABOVE.

*INSTANCES OF FORMULA:*
    1 PER DOMAIN, UPON EACH OCCURRENCE OF "SAVE & VIEW RESULTS"

*PSEUDOCODE FORMULA:*
    CALCULATE SUM OF USER_STATED_IMPORTANCE FOR EACH CATEGORY, ASSIGN VALUE TO STAR_IMPORTANCE

IF STAR_IMPORTANCE < 15, {DISPLAY A VARIATION OF FEEDBACK, SUCH AS FOLLOWS}

DISPLAY "YOU MAY WANT TO RECONSIDER THE LEVEL OF IMPORTANCE YOU ASSIGNED TO THE CATEGORIES, AS THE MAJORITY ARE LESS IMPORTANT OR NOT IMPORTANT."

ELSE IF STAR_IMPORTANCE > 27, {DISPLAY A VARIATION OF FEEDBACK, SUCH AS FOLLOWS}

DISPLAY "YOU MAY WANT TO REDUCE THE LEVEL OF IMPORTANCE YOU ASSIGNED TO THE CATEGORIES, SINCE YOU'VE IDENTIFIED THE MAJORITY AS MORE IMPORTANT."

FIG. 20

PERCENTAGE FIT PER CATEGORY (PRIOR TO LEVEL OF IMPORTANCE DOWNGRADE)

*FORMULA INTENT:*
- SUMMATIVE COMPARISON BETWEEN USER-SPECIFIED WANTS & NEEDS AND SERVICES THE PROVIDER OFFERS.
- PROVIDER CAN OFFER MORE THAN USER SPECIFIES, WITHOUT HARMING PERCENTAGE FIT; ONLY WHEN PROVIDER OFFERS LESS THAN USER SPECIFIES DOES PERCENTAGE FIT DECREASE.
- THIS FORMULA DOES NOT DISCOUNT/DOWNGRADE THE PERCENTAGE FIT BASED ON THE USER STATED LEVEL OF IMPORTANCE; THAT FORMULA OCCURS SEPARATELY.

*INSTANCES OF FORMULA:*
    7 PER DOMAIN IN INSTANCES WHEN A CATEGORY IS LABELED "FUTURE NEEDS"
    8 PER DOMAIN IN ALL OTHER INSTANCES

*PSEUDOCODE FORMULA:*
    FOR EACH PROVIDER,

FOR EACH CATEGORY 1 TO M,

IF CATEGORY IS NOT LABELED "FUTURE NEEDS",
    {FUTURE NEEDS CATEGORY IS NOT ATTRIBUTE-BASED, THEREFORE DO NOT ASSESS PERCENTAGE FIT}

FOR EACH CRITERIA 1 TO N,

ASSIGN EACH USER CHECKED CRITERIA A VALUE OF 1.0
            {REGARDLESS WHETHER DESIGNATED LESS IMPORTANT OR MORE IMPORTANT}

IF USER_CHECKED_CRITERIA IS ALSO A PROVIDER_CHECKED_CRITERIA
            {USER WANTS THIS CRITERIA, AND PROVIDER SUPPLIES THIS CRITERIA}

ASSIGN PROVIDER_CHECKED_CRITERIA VALUE A 1.0

CALCULATE SUM OF PROVIDER_CHECKED_CRITERIA WITHIN CATEGORY
        {NECESSARY TO DETERMINING PERCENTAGE FIT}

IF SUM = 0, THEN ASSIGN CATEGORY A VALUE OF 100%
        {NO USER PREFERENCES FOR THIS CATEGORY, SO DO NOT PENALIZE PROVIDER}

ELSE
                CALCULATE SUM OF USER_CHECKED CRITERIA
                {NECESSARY TO DETERMINE PERCENTAGE FIT}

DIVIDE PROVIDER_CHECKED CRITERIA BY USER_CHECKED_CRITERIA

DISPLAY VALUE AS CATEGORY_PERCENTAGE_FIT FOR PROVIDER

FIG. 21

PERCENTAGE FIT PER PROVIDER

*FORMULA INTENT:*
- ASSIGN DEGREE OF FIT TO EACH PROVIDER: "MOST RELEVANT", "RELEVANT" OR "OF INTEREST".
- ALTHOUGH EACH CATEGORY MAY HAVE BEEN ALREADY DISCOUNTED/DOWNGRADED BASED ON THE PRECEDING LOGIC, AN ADDITIONAL DISCOUNT/DOWNGRADE OCCURS, THIS TIME AT THE TOTAL FIT LEVEL, BASED ON CERTAIN CONDITIONS BEING TRUE.
- SPECIFICALLY, IF ANY NEED IS < 51% WHERE THE CORRESPONDING LEVEL OF IMPORTANCE IS "MOST IMPORTANT", THEN THE PROVIDER CAN'T RETAIN A "MOST RELEVANT" DESIGNATION, EVEN IF ORIGINAL DISCOUNTING ALREADY OCCURRED. THIS ADDITIONAL LOGIC TAKES INTO ACCOUNT THE SITUATION WHERE A PROVIDER HAS BEEN DEEMED "MOST RELEVANT" BASED ON AVERAGING OF EACH CATEGORY VALUE, BUT SHOULD NOT RETAIN THE DESIGNATION OWING TO PERCENTAGE FIT AND LEVEL OF IMPORTANCE OF A NEED.
- NOTE THAT BEFORE PROVIDER FIT IS DISCOUNTED FURTHER, THE LOGIC MAKES CERTAIN THAT A NEED WHICH IS LESS THAN 50% IS INDEED INTENDED AS "MOST IMPORTANT" BY THE USER, BECAUSE IF IT ISN'T "MOST IMPORTANT" THEN THERE IS NO NEED TO FURTHER DISCOUNT THE PROVIDER.

*INSTANCES OF FORMULA:*
EQUAL TO THE NUMBER OF PROVIDERS FOR THE DOMAIN {SINGLE-PRODUCT DOMAINS ONLY.}

*PSEUDOCODE FORMULA:*

FOR EACH PROVIDER,

CALCULATE SUM OF CATEGORY_PERCENTAGE_FIT FOR ALL CATEGORIES, ASSIGN VALUE TO TOTAL_FIT
{VALUES ONLY EXIST FOR THOSE CATEGORIES NOT LABELED "FUTURE NEEDS".}

IF TOTAL_FIT <> 0 THEN
{WHEN TOTAL_FIT = 0 THEN DISPLAY "OF INTEREST".}

IF TOTAL FIT > 74% AND NEEDS P, Q AND R ARE ALL GREATER THAN 49%
  THEN ASSIGN "MOST RELEVANT" TO PROVIDER

{REGARDLESS OF LEVEL OF IMPORTANCE, PROVIDER HAS QUALIFIED FOR A "MOST RELEVANT" DESIGNATION.}

ELSE FOR NEEDS P, Q AND R THEN

{A SINGLE INSTANCE OF A PERCENTAGE FIT < 51% COUPLED WITH A "MORE IMPORTANT" DESIGNATION FOR THAT NEED WILL DOWNGRADE THE PROVIDER TO "RELEVANT".}

IF TOTAL FIT > 75% AND
  NEED P LEVEL OF IMPORTANCE IS "MORE IMPORTANT" AND
  NEED P PERCENTAGE FIT < 51%

OR IF TOTAL FIT > 75% AND
  NEED Q LEVEL OF IMPORTANCE IS "MORE IMPORTANT" AND
  NEED Q PERCENTAGE FIT < 51%

OR IF TOTAL FIT > 75% AND
  NEED R LEVEL OF IMPORTANCE IS "MORE IMPORTANT" AND
  NEED R PERCENTAGE FIT < 51%

FIG. 22

THEN ASSIGN "RELEVANT" TO PROVIDER

ELSE
{IN THIS LOGIC, NONE OF P, Q OR R CAN BE "MORE IMPORTANT" WITH A CORRESPONDING PROVIDER FIT < 51% BECAUSE THOSE CONDITIONS WOULD HAVE BEEN TRAPPED IN THE PRECEDING LOGIC, SO THE ONLY POSSIBILITIES ARE COMBINATIONS OF ("LESS IMPORTANT" WITH PROVIDER FIT < 51%) OR ("LESS IMPORTANT" WITH PROVIDER FIT > 50%). NEITHER CONDITION IS SUFFICIENT TO DISCOUNT/DOWNGRADE TOTAL FIT FOR THE PROVIDER; THEREFORE THE TOTAL FIT CAN REMAIN "MOST RELEVANT" AS ORIGINALLY CALCULATED.}

IF TOTAL FIT > 74% AND
    NEED P LEVEL OF IMPORTANCE IS "LESS IMPORTANT" AND
    NEED P PERCENTAGE FIT < 51%

OR IF TOTAL FIT > 74% AND
    NEED Q LEVEL OF IMPORTANCE IS "LESS IMPORTANT" AND
    NEED Q PERCENTAGE FIT < 51%

OR IF TOTAL FIT > 74% AND
    NEED R LEVEL OF IMPORTANCE IS "LESS IMPORTANT" AND
    NEED R PERCENTAGE FIT < 51%

THEN ASSIGN "MOST RELEVANT" TO PROVIDER

ELSE
{HERE, A SINGLE INSTANCE OF P, Q OR R OF "MORE IMPORTANT" WITH A CORRESPONDING PERCENTAGE FIT OF < 51% WILL DISCOUNT/DOWNGRADE TOTAL FIT TO "RELEVANT" FROM "MOST RELEVANT".}

IF TOTAL FIT > 74% AND IF ANY OF THE FOLLOWING IS TRUE

NEED P LEVEL OF IMPORTANCE IS "MORE IMPORTANT" AND
    NEED P PERCENTAGE FIT < 51%

NEED Q LEVEL OF IMPORTANCE IS "MORE IMPORTANT" AND
    NEED Q PERCENTAGE FIT < 51%

NEED R LEVEL OF IMPORTANCE IS "MORE IMPORTANT" AND
    NEED R PERCENTAGE FIT < 51%

THEN ASSIGN "RELEVANT" TO PROVIDER

ELSE
{A SINGLE INSTANCE OF A PERCENTAGE FIT < 51% COUPLED WITH A "MORE IMPORTANT" DESIGNATION FOR THAT NEED WILL DOWNGRADE THE PROVIDER TO "OF INTEREST".}

IF TOTAL FIT > 49% {BUT LESS THAN 75%} AND
    NEED P LEVEL OF IMPORTANCE IS "MORE IMPORTANT" AND
    NEED P PERCENTAGE FIT < 51%

FIG. 22 (Cont.)

OR IF TOTAL FIT > 49% {BUT LESS THAN 75%} AND
    NEED Q LEVEL OF IMPORTANCE IS "MORE IMPORTANT" AND
    NEED Q PERCENTAGE FIT < 51%

OR IF TOTAL FIT > 49% {BUT LESS THAN 75%} AND
    NEED R LEVEL OF IMPORTANCE IS "MORE IMPORTANT" AND
    NEED R PERCENTAGE FIT < 51%

THEN ASSIGN "OF INTEREST" TO PROVIDER

ELSE
{IN THIS LOGIC, NONE OF P, Q OR R CAN BE "MORE IMPORTANT" WITH A CORRESPONDING PROVIDER FIT < 51% BECAUSE THOSE CONDITIONS WOULD HAVE BEEN TRAPPED IN THE PRECEDING LOGIC, SO THE ONLY POSSIBILITIES ARE COMBINATIONS OF ("LESS IMPORTANT" WITH PROVIDER FIT < 51%) OR ("LESS IMPORTANT" WITH PROVIDER FIT > 50%). NEITHER CONDITION IS SUFFICIENT TO DISCOUNT/DOWNGRADE TOTAL FIT FOR THE PROVIDER; THEREFORE THE TOTAL FIT CAN REMAIN "RELEVANT" AS ORIGINALLY CALCULATED.}

IF TOTAL FIT > 49% {BUT LESS THAN 75%} AND ANY OF THE FOLLOWING IS TRUE

NEED P LEVEL OF IMPORTANCE IS "LESS IMPORTANT" OR "NOT IMPORTANT" AND
    NEED P PERCENTAGE FIT < 51%

NEED Q LEVEL OF IMPORTANCE IS "LESS IMPORTANT" OR "NOT IMPORTANT" AND
    NEED Q PERCENTAGE FIT < 51%

NEED R LEVEL OF IMPORTANCE IS "LESS IMPORTANT" OR "NOT IMPORTANT" AND
    NEED R PERCENTAGE FIT < 51%

THEN ASSIGN "RELEVANT" TO PROVIDER

ELSE
{REGARDLESS OF LEVEL OF IMPORTANCE, PROVIDER HAS QUALIFIED FOR A "RELEVANT" DESIGNATION.}

IF TOTAL FIT > 49% {BUT LESS THAN 75%} AND ALL OF THE FOLLOWING ARE TRUE

NEED P PERCENTAGE FIT > 49%
    NEED Q PERCENTAGE FIT > 49%
    NEED R PERCENTAGE FIT > 49%

THEN ASSIGN "RELEVANT" TO PROVIDER

ELSE
{"OF INTEREST"}

{DEFAULT VALUE, AS ALL OTHER CONDITIONS HAVE BEEN TESTED.}

ASSIGN "OF INTEREST" TO PROVIDER.

SYSTEM AND METHOD FOR SINGLE DOMAIN AND MULTI-DOMAIN DECISION AID FOR PRODUCT ON THE WEB

CLAIM OF PRIORITY

This application claims priority from U.S. Provisional Patent Application Ser. No. 61/541,345, filed Sep. 30, 2011, currently pending.

FIELD OF THE INVENTION

The present invention relates generally to computer-based decision systems and methods and, more particularly, to a system and method for solving problems in multiple domains or subject matter areas on the web/Internet.

Web-based decision aids are intended for use in human problem-solving, specifically to assist end-users—including consumers, professional intermediaries, technicians and other professional personnel—in decision-making within subject matters selected by the user. An example of a decision aid is presented in U.S. Pat. No. 7,761,345 to Marin et al.

Whereas a user's selections, likes and dislikes are typically captured from decision aids and stored at the account or profile level in prior art systems, and are therefore used to define the user in whole, what is needed is a system that captures and assesses preferences at the domain or subject matter level. Examples of domains include, but are not limited to, Financial Assets, Senior Assisted Living Facilities, etc.

In addition, what is needed is a system and method that uses decision aids as secondary, separate profiling mechanisms for the user, thereby facilitating representation of that user as related to a single subject matter at a time. This one-by-one delineation of user preferences to subject matter would enable, through methods, algorithms and meta tag technology, meaningful social connection, eCommerce and content delivery, subject-by-subject versus en masse. Furthermore, by capturing from the decision aids the combination of domain-specific user behavior (such as selections, implicit clicks) and explicitly stated importance, user intent could be synthesized to reveal conclusions that, from a marketing perspective, surpass traditional approaches that draw statistics from disjointed user clicks.

Furthermore, a need exists for a system and method that synthesizes results of multiple users who, within a chosen domain, have utilized the decision aid to reach a result, so that further intelligence may be formulated. More specifically, a need exists for a system and method where an intelligent agent utilizes cross-user observations to supplement coaching generated by intra-user observations—both selection criteria and stated importance—so that advances may be achieved beyond decision aids that rely solely on explicitly-stated user preferences to identify potential results.

Prior art decision systems and methods are typically based on the hypothesis which states that user preference, a value explicitly notated by the user, results in better decision-making. A need exists, however, for a technical representation of a contrary hypothesis, whereby user preference is derived by both implicit and explicit behavior, and whereby a user's clicks implicitly signal preference. Explicitly-denoted, stated importance could then be applied to qualify the implicit choices, specifically devaluing them in cases where a user denotes that certain choices are less important than others. Stated importance could therefore be treated as a directive when finalizing a solution set of results for the user, but could be applied secondarily, after an initial decision-pool has been assembled via implicit choice. A need therefore exists for a system and method where application of user preference, combined with implicit and explicit behavior to establish user mindset, drives results.

Further, since an intelligent agent's responses are unique to user behavior/clicks and stated importance rather than being "canned" responses, the user would receive meaningful feedback (such as education regarding potential benefits or risks associated with clicks) no matter what criteria is selected, or what importance-level the user prescribes. As a consequence, the user is more likely to experiment and explore. From a marketing perspective, encouraging this exploratory mindset cultivates cross-sell or up-sell opportunities that are traditionally difficult to initiate.

SUMMARY OF EMBODIMENTS

A cross-domain decision aid for use on the web/Internet is described. According to one embodiment of the invention, subsets of criteria, each associated with one of eight topical categories, represent Selection Criteria that form the foundation for a user's Overall Stated Importance for each category. While Overall Stated Importance allows users to designate personal importance of each category by setting specific criteria to Not Important, Less important or More Important, it is the relationship between Selection Criteria and Overall Stated Importance that is paramount.

Selection Criteria enables the user to fully consider attributes or goals (queries) within a category; Overall Stated Importance is calculated based on the user's level-of-importance designations for items within each category, chosen from a modified Likert scale where Not important is the default selection, and where Less important or More Important require the user to commit to personal applicability (since no middle-of-the-road option is available, the user cannot "opt out" of commitment).

Both Selection Criteria and Overall Stated Importance drive the system's artificial intelligent agent.

The intelligent agent provides insight into the user's thought process through semantic processing, thereby teasing out inconsistencies as well as similarities within categories, across categories and across topics. Furthermore, by knowing what other users have done within a similar domain, the intelligent agent can provide instant feedback to a user newly exploring a domain, for example:

1. Members who have specified similar goals have also indicated a preference to look at . . . . "

2. "You may want to explore [Topic N], based on others who have expressed interests similar to your interests."

The intelligent agent educates users by citing relevant expertise in the forms of articles, models and other media-rich content. Within a Blog or Tips Forum style of content delivery, the agent provides warnings, cautions and opportunities. This combination of education, directed feedback and exposure to relevant results elevates the decision process, making it a highly interactive process, not a static event. By providing intelligent feedback via facts and observations that the user may not know otherwise, and by dynamically refining feedback with each user behavior, the system aids users in making not only different, but smarter decisions.

Within each subject area, Selection Criteria are divided into Wants and Needs, each containing four categories. Traversed by algorithms, this hierarchy enables the intelligent agent to tailor education based on user behavior, and to direct users to consider providers, products and services beyond those of a similar nature, such that inchoate Wants and Needs may be translated into results non-obvious or previously unknown by the user, oftentimes enhancing or modifying those results a user would have otherwise foremost considered. From the outset, users may not know the result they Want or Need, or users may know they Want or Need a category of result but may be unclear as to the nuances as well as breadth of the various options; additionally, users may be initially predisposed toward a type of result that, upon introspection and coaching, is exposed as adverse to their Wants and Needs. To this end, decisioning within the system goes beyond effectuating a purchase or result that a user already knows that they want. Further, the system recognizes that both Wants and Needs drive behavior, and that oftentimes Needs eclipse Wants, as for instance when Needs pertain to medical requirements, or to financial or time constraints. To this extent, the system contains logic such that Needs trump Wants; specifically, an algorithm devalues potential results by assigning a higher weight to Needs than to Wants (note that an exception to this rule occurs when the Overall Stated Importance for a Need is less than for a Want). Coaching by the intelligent agent transcends decision-making into outcomes of self satisfaction, self fulfillment, self awareness or success; within such an environment, results go beyond tangible products and services, such that they may include pursuing an entirely different course of action.

The system's use of Selection Criteria plus Overall Stated Importance results in products/services by one or a combination of two methods: given whether the chosen domain is Single-Product, whereby user-selected criteria mirror attributes of each product provider such that the ratio of user-criteria to provider-attributes is 1:1; or Multi-Product, whereby stated user goals are assessed/aggregated then mapped to all relevant products, whereby the ratio of user-criteria to products is M:N.

Within the Single-Product method, each returned provider varies in degree-of-fit of the same conceptual product (for instance, a Daycare facility, a Senior Living Facility, a University). Via percentage-based calculations, Single-Product providers are designated as Most Relevant, Relevant and Of Interest. Within the Multi-Product Method, returned providers vary in degree-of-fit of potentially many products (for instance, Financial Investment Alternatives, Preventive Health Measures, End-of-life Considerations).

In the Single-Product method, a provider is not penalized for providing more products and services than a user's specified Wants and Needs; rather, a provider is penalized only for providing less products and services; as such, in the extreme case, a user who selects zero criteria, whereby no Wants and Needs are specified, will be returned all providers as Most Relevant; however, as the user selects more criteria, more providers are disqualified as Most Relevant and Relevant providers. This inverse relationship can be represented as follows:

An increase in value of C (where C represents the number/specificity of a user's Wants and Needs) from 0 to m, results in a decrease in P (where P represents the number of providers deemed Most Relevant and Relevant) from n to 0.

In the Single-Product method, an Overall Stated Importance of More important calculated for a Need category acts to devalue any provider whose corresponding attributes have a less-than favorable match (determined via a percentage-based calculation) regardless of isolated criteria producing a favorable match, or entire Want categories producing an overall highly favorable match, in such cases, Needs trump Wants, and a provider originally deemed Most Relevant is devalued to Relevant; a provider originally deemed Relevant is devalued to Less Relevant.

Within the system, the results container for the Multi-Product method does not point to a list of singular providers; rather, it evaluates every day Wants and Needs then translates those into potential products and services. Rather than present a pre-defined, static set of results for a single provider, then apply user preference to narrow the choice, the system purposefully separates providers' products and services from the user's field of choices, such that user selected criteria are evaluated to return results relevant to the user's Selection Criteria and Overall Stated Importance. In this manner, the system harnesses technology to reduce the field of results to those with the highest degree of user-relevancy prior to presenting the set to the user, such that a decision is made from a customized solution set, containing only elements that have been pre-qualified as being applicable to the user's Wants and Needs. Only after the user chooses a product or service to review does a list of qualified providers appear, each containing a web/Internet link/URL leading to provider-specific products or services.

BRIEF DESCRIPTION OF THE DRAWINGS

FIG. 2 through FIG. 6 are examples of User Interface renderings in an embodiment of the invention.

FIG. 7 lists self-learning behaviors intrinsic to an embodiment of the present invention, and that enable the system to filter results based on user demonstrated behaviors, as well as Persona-type behaviors, which act as baselines from which to compare users and determine relevancy;

FIG. 9 illustrates mapping within the Multi-Product method, structured as a semantic network;

FIGS. 10 through 12 display instances of ontological relationships contained within the Multi-Product Method;

FIGS. 13 through 17 display flow diagrams, use cases and instances of conditional feedback tied to an embodiment of the present invention;

FIG. 18 is an illustration of a mathematical, integer-based algorithm that can be used to represent user choices in a manner by which choices can be electronically compared to those of other users, and for the end-purpose of connecting users otherwise unknown to one another;

FIG. 19 through 22 are examples of logic, tests & conditions which assess user input and drive intelligent feedback and display of results within an embodiment of the current invention;

Figure 25:
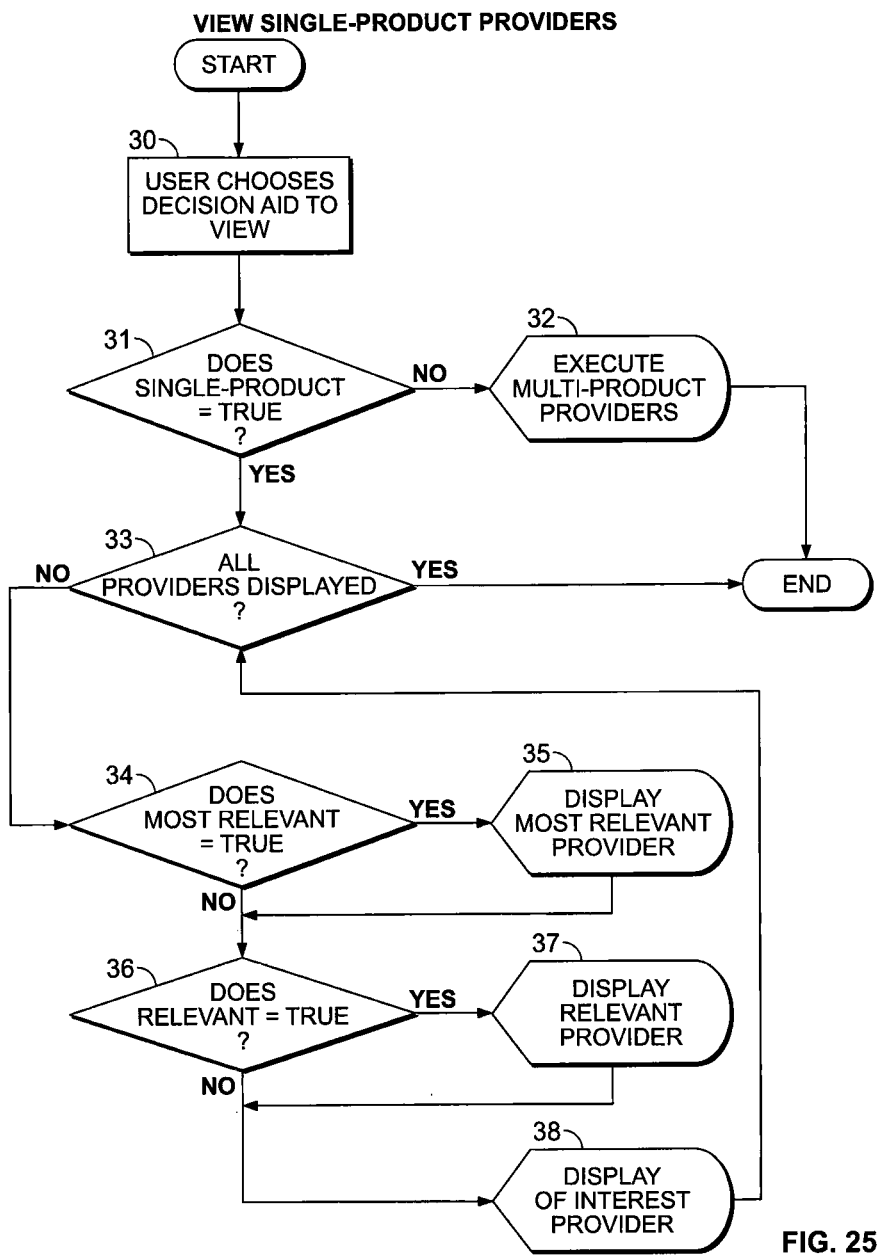
Figure 26:
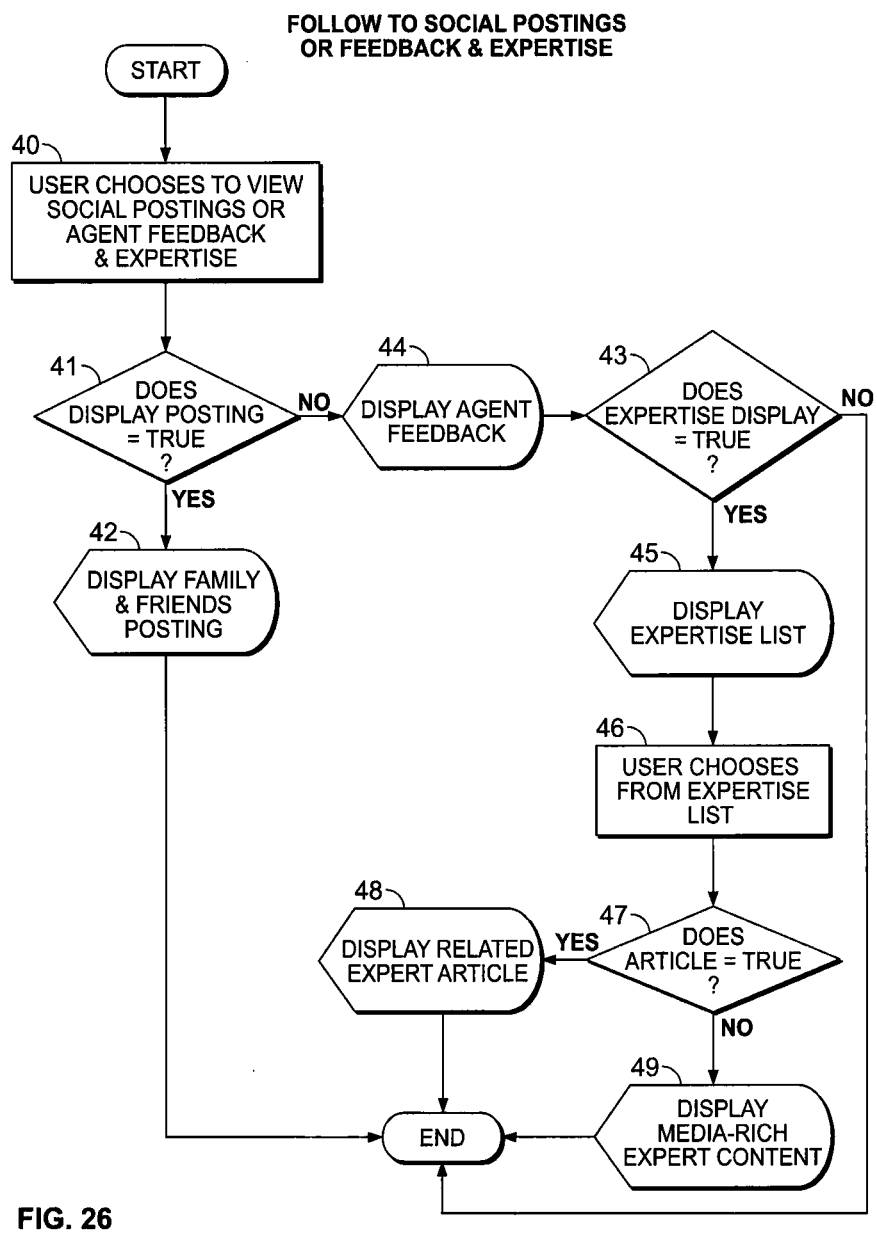
Figure 27:
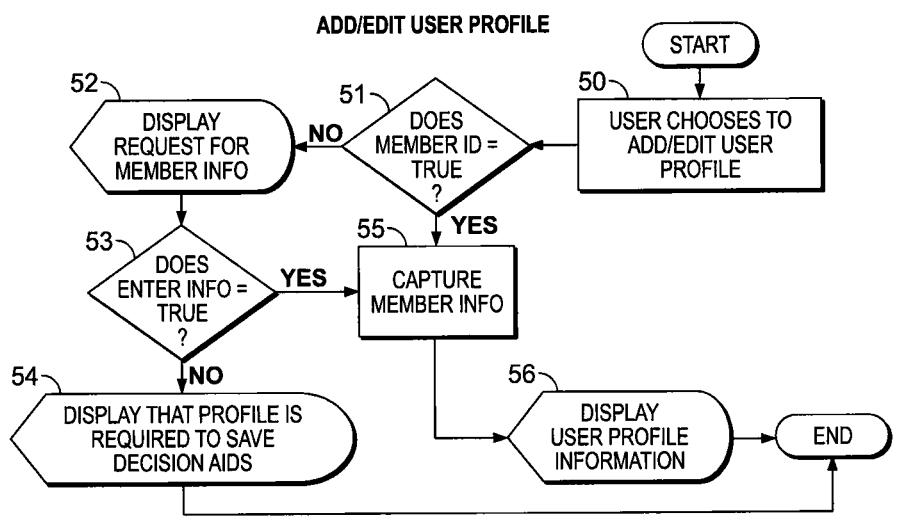
Figure 28:
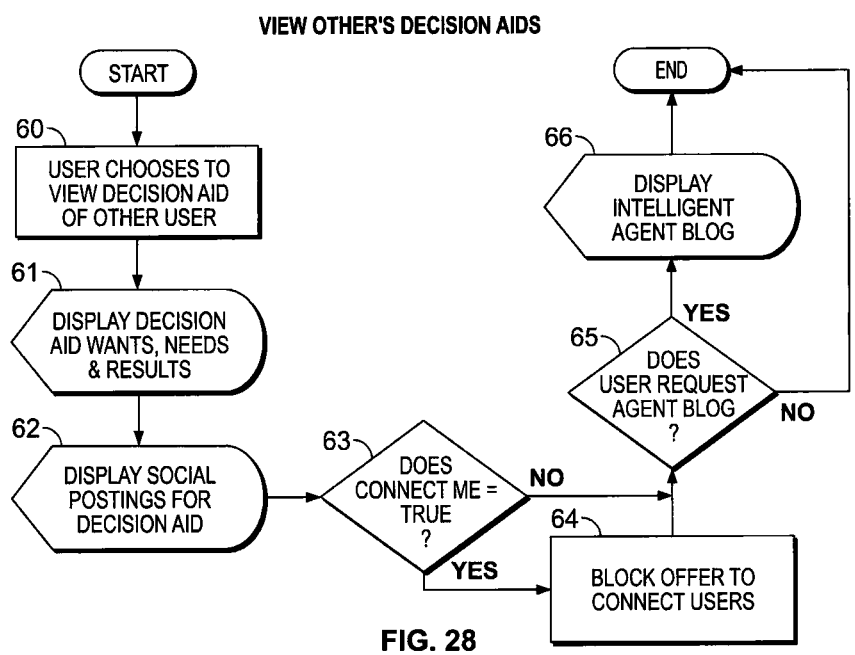
Figure 29:
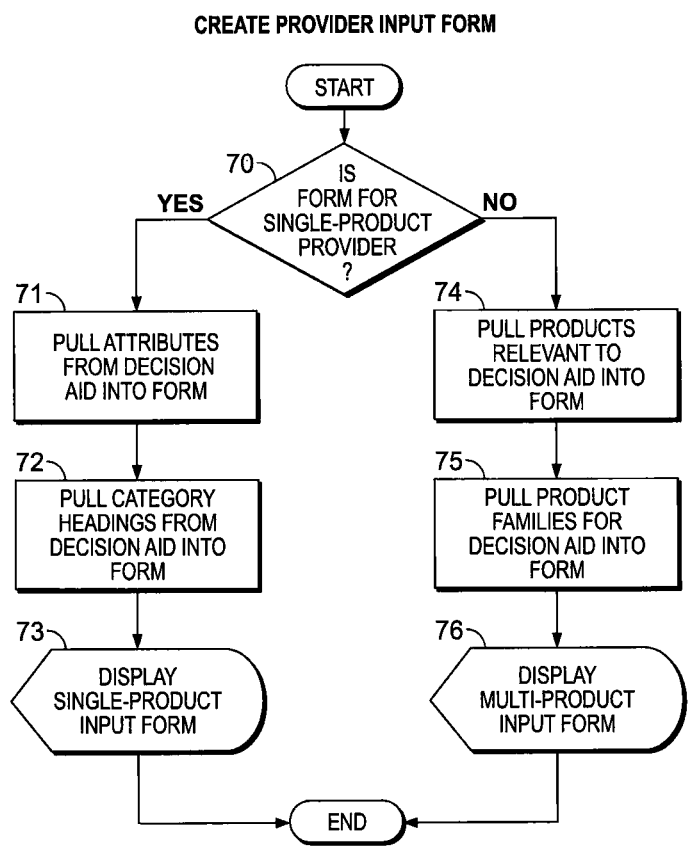
Figure 30:
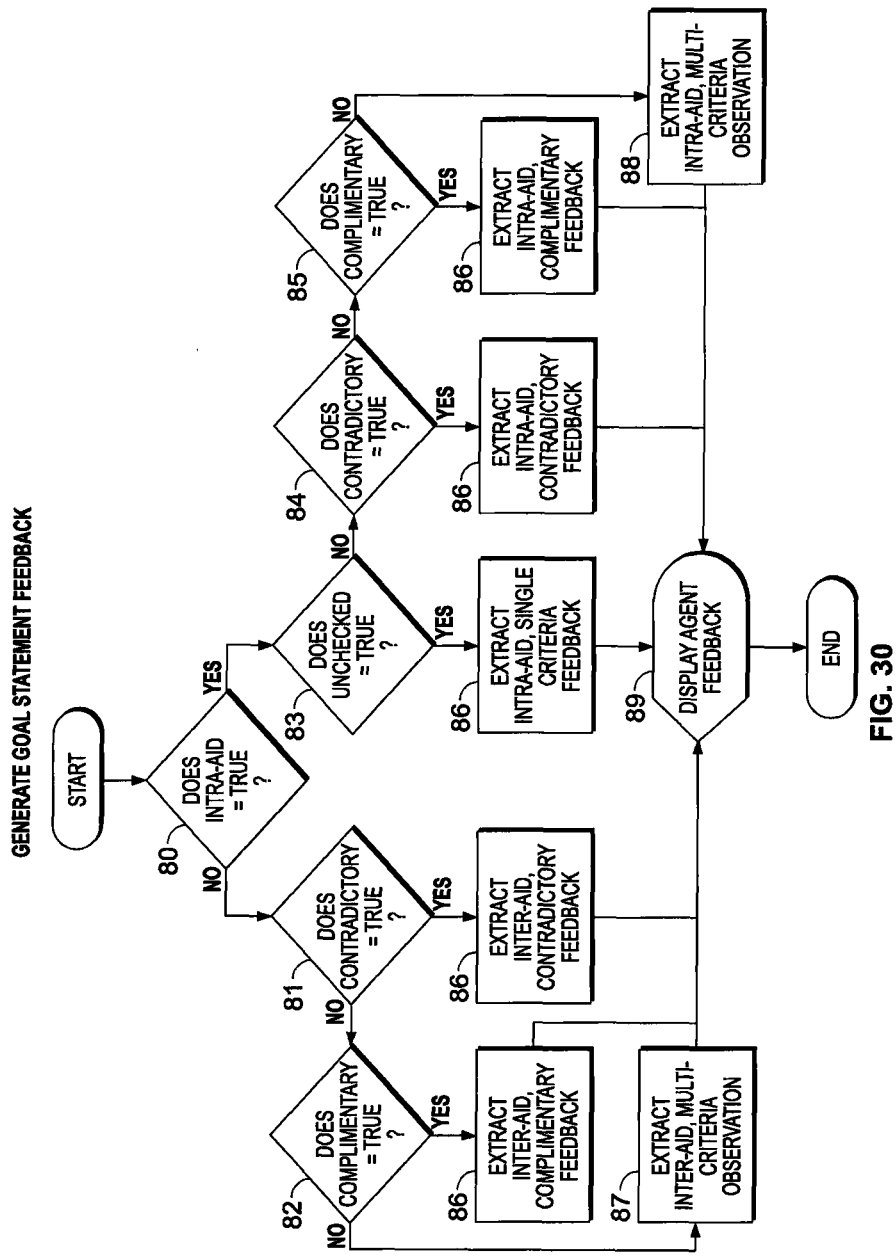
Figure 31:
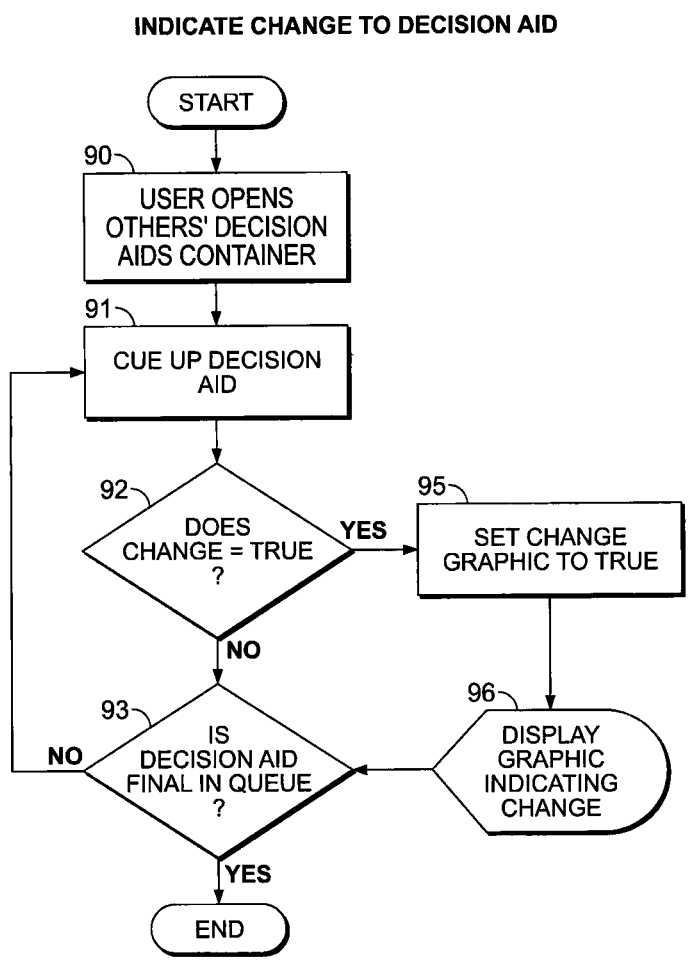
Figure 32:
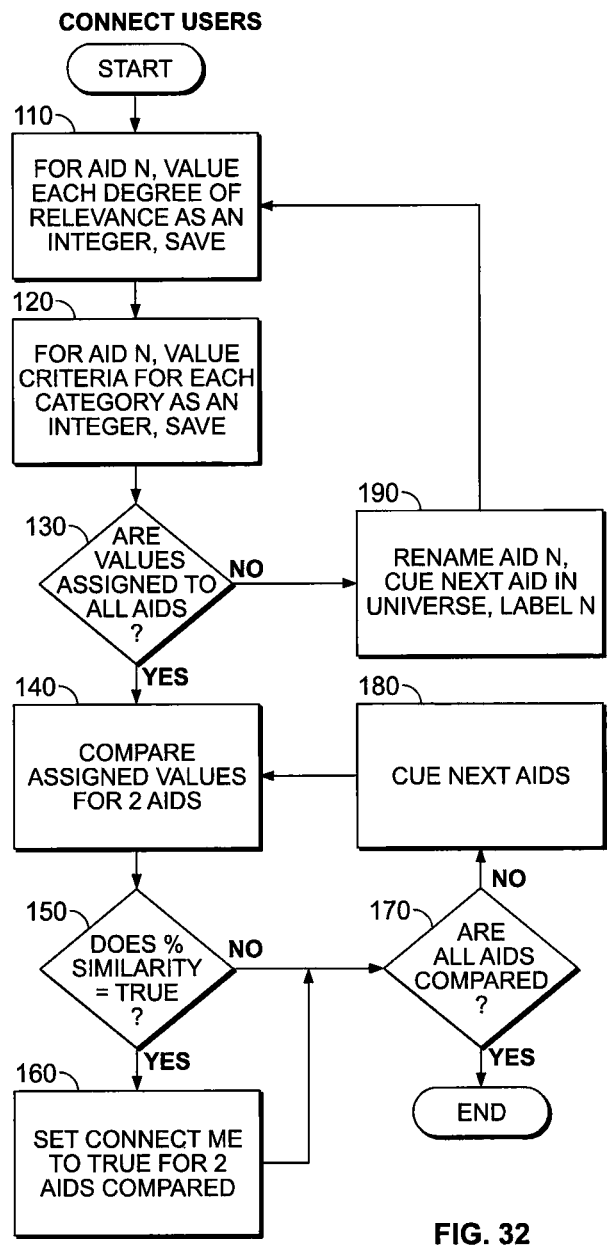
Figure 33A:
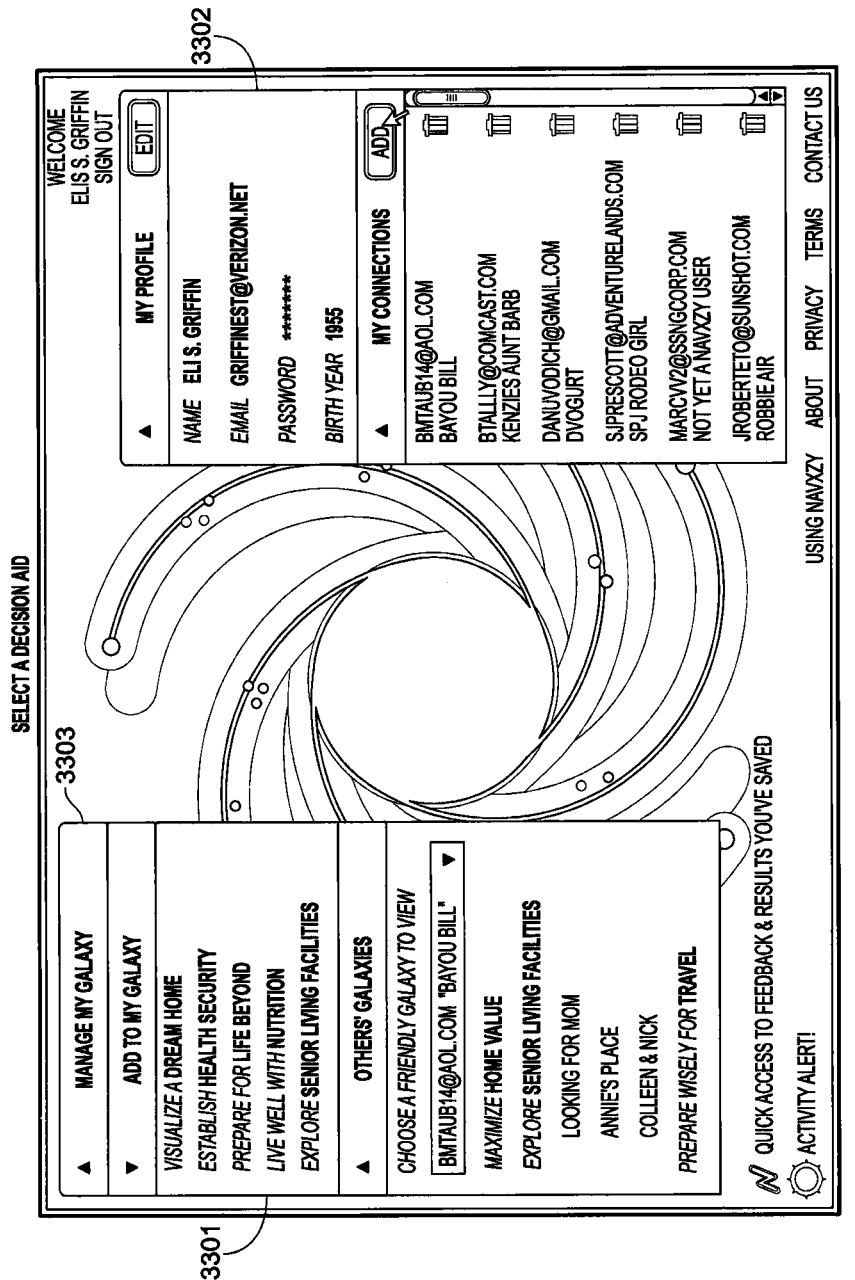
Figure 33C:
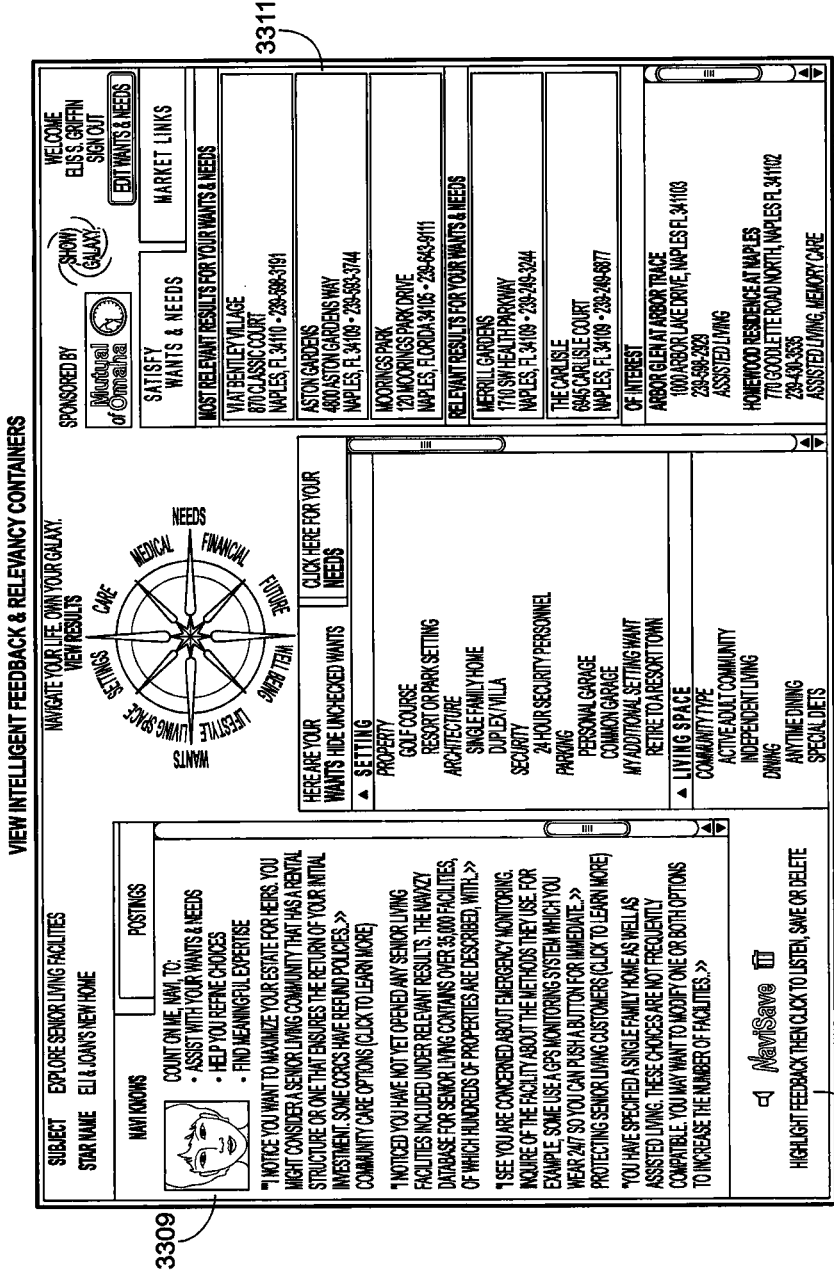
Figure 33D:
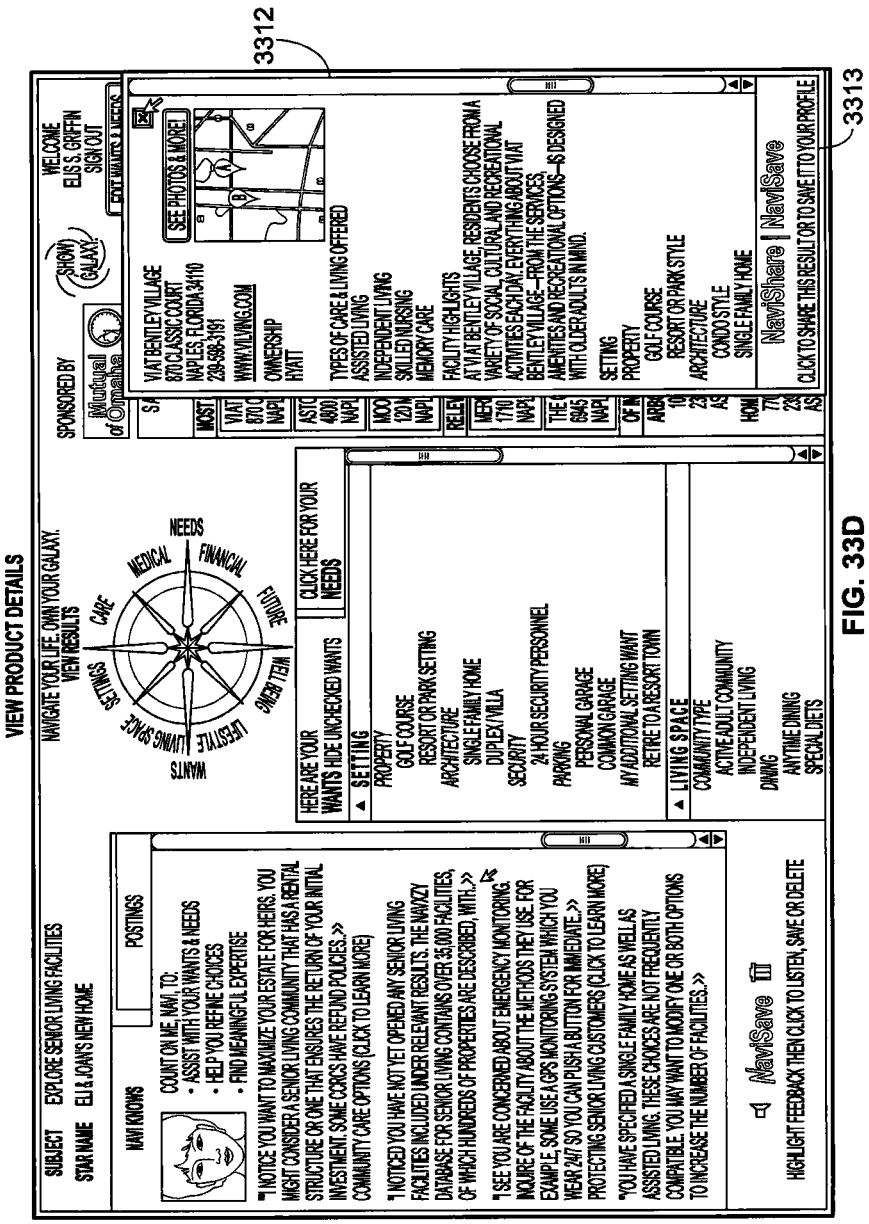
Figure 33E:
Figure 33F:
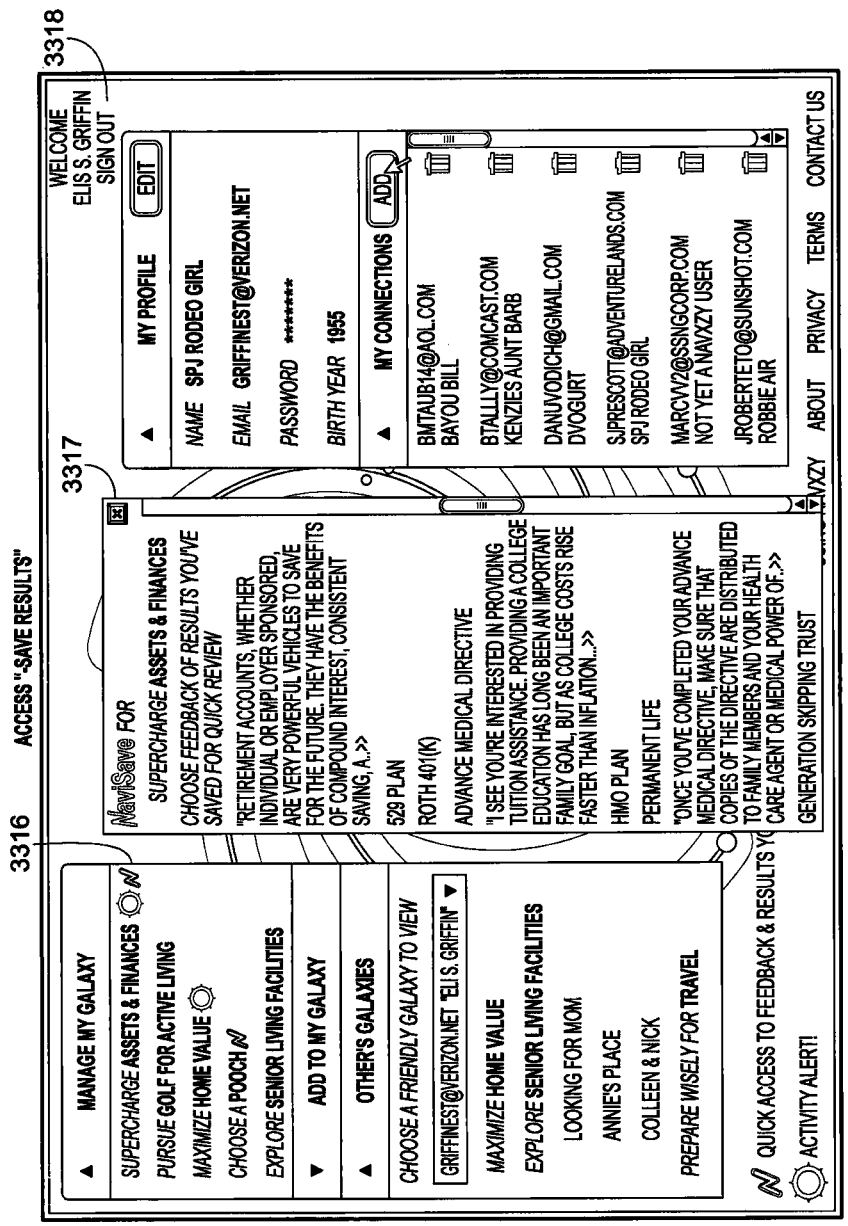

viewing displayed results and ii) being presented with options of connecting with other users based on the user's specified Social Share criteria, and with similarity to other users as evaluated via the Social Connect method:

FIG. 25 is a flow chart illustrating providers associated with user Stated Importance and Selection Criteria, based on execution of either the Single-Product method or the Multi-Product method;

FIG. 26 is a flow chart illustrating method for displaying a social blog, expertise or agent feedback, based on user request and the format of the associated content;

FIG. 27 is a flow chart showing adding, displaying and editing user profile information, which is used to permit saving of decision aids and connecting with other users;

FIG. 28 is a flow chart illustrating a method for determining the visual display elements appropriate to disclose to other users, based on the originating user's specified Social Share criteria;

FIG. 29 is a flow chart illustrating a structured process for creating proprietary Content Input Forms which are tied to decision aids by subject matter and which capture products and services from either Single-Product or Multi-Product Providers;

FIG. 30 is a flow chart showing a method for displaying, via intelligent agent recommendations, content of higher-order relevancy from a proprietary database, which is based on criteria either within a user-specified decision aid, across user decision aids, or across users who have demonstrated similarity in preferences;

FIG. 31 is a flow chart showing a method for determining the visual display of icons for the decision aids, based on updates to the decision aid by users, by providers or by the intelligent agent;

FIG. 32 is a flow chart illustrating a method for determining compatibility or percentage similarity of users' decision aids;

Figure 33B:
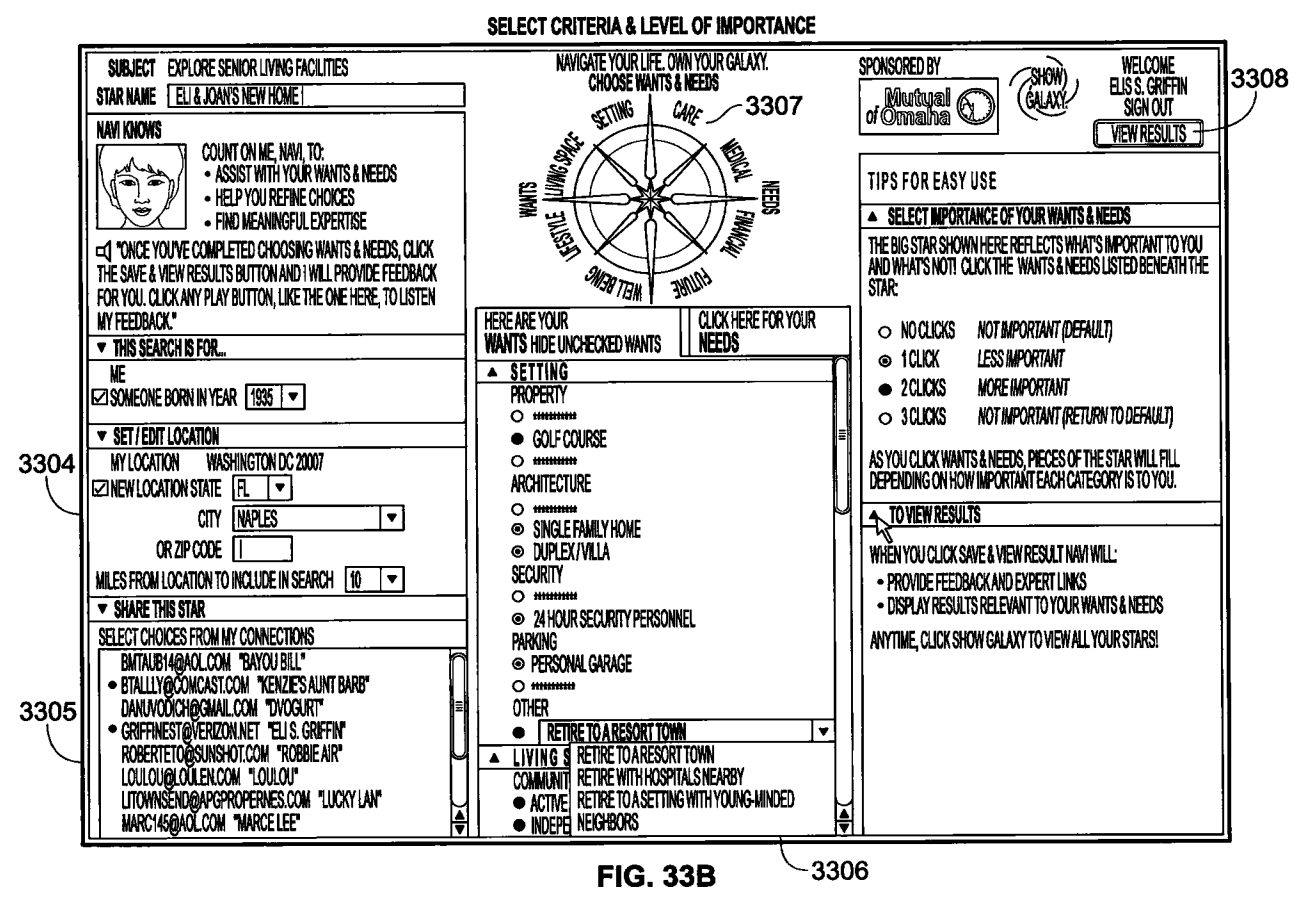

FIGS. 33a-33f present an example walkthrough of user interfaces in an embodiment of the present invention that are common across Single-Product and Multi-Product Domains, and where FIG. 33-b, 33-c, 33-d and 33-c provide an embodiment of the Single-Product Domain, specifically i) selecting criteria and level of importance, ii) viewing Intelligent Agent feedback, iii) accessing social postings, and iv) reviewing relevant results.

DETAILED DESCRIPTION OF EMBODIMENTS

A web-based decision aid, for use across domains to assist in human problem solving, is described. The drawings contained herein—including process flows, renderings of user interfaces, use cases, mathematical models and formulas—are displayed to convey system aspects versus system limitations. Advantages of embodiments of the present invention include, without limitation, assisting the user in making decisions through intelligent agent expertise, as well as through related eCommerce, social networking, guided content search and delivery of context-rich content. Furthermore, whereas web profiles typically define members in their entirety, such that preferences are tied to a profile as a whole, embodiments of the present invention delineates a member's preferences based on specific subject matter areas, assessing those preferences by implicit and explicit user behaviors. Within embodiments of the present invention, any decision aid can be easily added, deleted or updated, without disrupting or altering social interactions, eCommerce and search capabilities related to a member's other decision aids.

Figure 1:
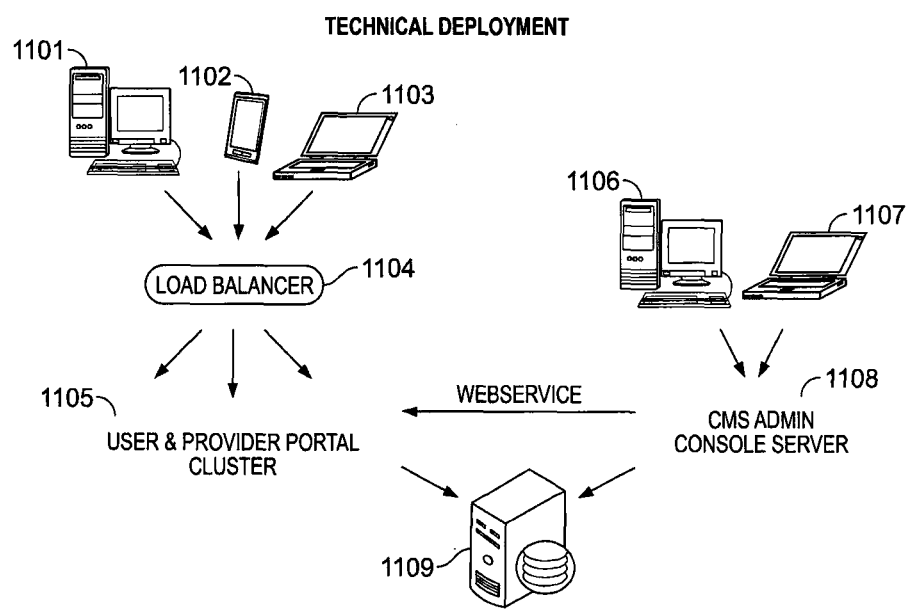
FIG. 1 illustrates an embodiment of the system of the invention where users connect through desktop computers, laptops, tablets and mobile devices to web servers, thereby gaining access to UI, algorithms and databases of the system and, through the system, to third party servers and content.

FIG. 1 illustrates an embodiment of the system of the invention. Users, via browser-enabled controls available on remote access devices such as smart phones, tablets and personal computers (1101 through 1103), connect to one or more web servers (1109) containing an embodiment of the invention's algorithms, data schemas and databases, through load balancing and clustering technology shown in 1104 and user and provider portal cluster or Internet 1105. Also referring to the embodiment of the invention of FIG. 1, 1106 and 1107 represent access to the system's Content Management System 1108, enabling creation of proprietary content, as well as management of links to third-party products, services and content deemed relevant to the user, as determined by ontological subsets and percentage-similarity calculations described in FIGS. 9-12 and FIGS. 19-22, discussed below.

User Interfaces & Results Display

Referring to FIGS. 2A through 4B, there are shown wireframes and renderings representing screens in an embodiment of the present invention's user interface. Here, the graphical displays are shown to convey primary interfaces—namely Add/Update Profile & Domains, Choose Wants & Needs and View Results—not as limitations of the user web experience, which includes overlay windows, mouse-over tool tips and browser windows.

Figure 2A:
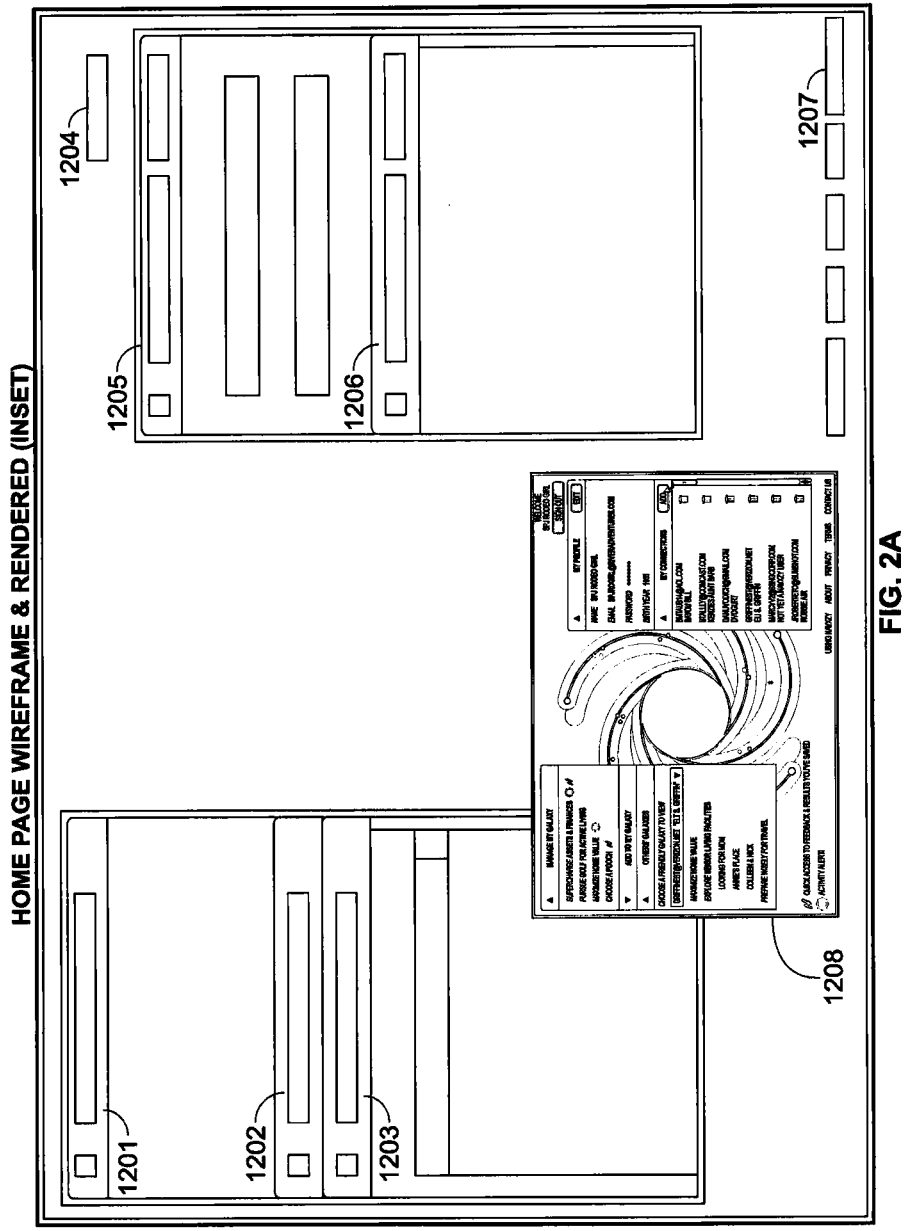
Figure 2B:
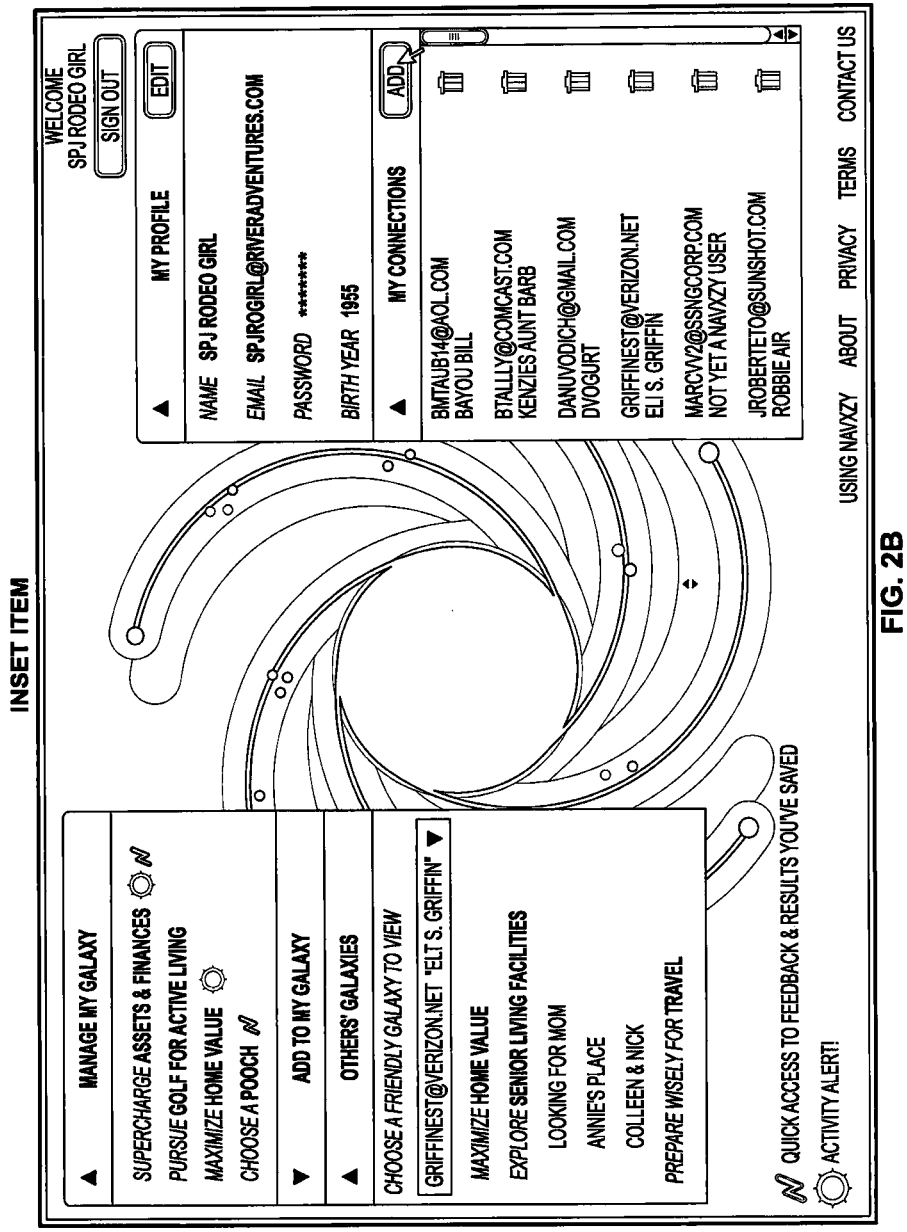

In further detail, within the homepage screen of FIG. 2A, a wireframe for Add/Update Profile & Domains is displayed, where 1201 permits user access to previously saved decision aids—those for which Wants and Needs have been chosen by the user earlier, either during the current session or a prior session.

Within the container 1201, as with other containers within the system, are reveal/hide controls, a scroll bar to access content beyond that displayed within the boundaries of the container, and active-click labels used to launch content.

Now, still referring to the screen of FIG. 2A, the container represented by 1202 indicates a container through which a user may choose from decision aids to add to their member account; specifically, the container lists all possible decision aids, grouped by topical neighborhood. The container represented by 1203 permits user access to Other's Decision Aids; this container lists all decision aids created by other members who have granted the user permission to review and comment on their decision aids. 1204 indicates a Sign-in/Sign-out capability, whereas 1205 indicates a container for adding or updating a user profile, for which example mandatory fields include Unique User Name and Password, Verified email Address and User Birth Year. The My Connections container represented by 1206 permits users to establish a master list of family members and friends, from which the user later grants review & comment permissions for decision aids, determined by the user on a case-by-case basis versus en masse. Within an embodiment of the present invention, still referring to 1206, My Connections are initially established by specifying an email address contained within a member database; in cases where an email address exists, a connection confirmation message is displayed, along with associated User Name. The list of all those members within a user's My Connections list is displayed on the user-specific view of the homepage. 1207 indicates Help, About and Terms & Conditions links. In FIG. 2A, inset 1208 is a graphical rendering of the wireframe after a user has created an account and added decision aids. An enlarged view of graphical rendering is provided as FIG. 2B.

Figure 3:
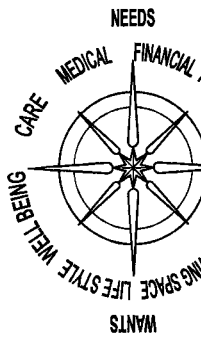

Once the user has selected a domain (and created an account and entered profile information), the screen of FIG. 3 is displayed. The screen of FIG. 3 is used by the user to create a decision aid. FIG. 3 illustrates a graphical rendering of Choose Wants & Needs, where 1301 enables a user to name the decision aid, and where 1302 represents a container for capturing high-level filter information. Here, user-demographics are used to narrow resultant datasets that are retrieved from the web/Internet. Beyond cross-domain filters such as birth year, the value of which is captured at the profile level, certain filters are domain-specific, or are relevant to multiple but not all domains. Location, for example, is necessary within a Financial Assets domain to parse-out banks that do not operate in certain U.S. states. This filter isolates location-relevant providers from the universe of all providers identified as potentially relevant, thereby preventing the display of non-meaningful banks. Location is also applicable to domains returning relevant facilities (for example, Senior Living, Golf Courses); in such cases, Location narrows the universe of providers to a subset satisfying a true condition of user-chosen geo-centricity. In one embodiment of the present invention, third-party tools are used to streamline and/or expand the Location example. As for streamlining, the user interface allows users to enter city/state versus zip code; here, third-party apps are leveraged to convert city/state to zip code. As for expanding Location, the user interface allows users to enter a search radius from the specified city/state or zip code. Again, third-party apps determine all zip codes within the specified radius; that series of zip codes is then used to retrieve the subset of relevant providers.

In further detail, still referring to 1302, results for the decision aid are filtered through an Exception Rule Base; the same Exception Rule Base is applied to Single-Product Domains and to Multi-Product Domains. For example, birth year is relevant for domains such as Senior Living and Healthcare, among others. Consider the case where an intended Senior Living Facility search is for an aged senior, 85 years or older. If the user selects a Want that could return a result more suitable for a younger, more active senior, then results are tempered to reflect the birth year filter. Specifically, a facility tagged as an Active Adult Community, and that without the filter would otherwise be displayed as Most Relevant, is discounted to Relevant; a facility otherwise displayed as Relevant is discounted to Of Interest. An embodiment of this Exception Rule for discounting results can be understood as follows: for any product calculated as Most Relevant and that contains potential exception content, assess a rule base $[R_1, R_M]$ for limits to the exception content. For example, if Rule K states "Active Adult Community"<"84 Years" for birth year, and if the exception test fails, then discount the product from Most Relevant to Relevant, or from Relevant to Of Interest. The discounting algorithm is not applied if the product is originally returned as Of Interest, since no tier exists beneath Of Interest.

Now, still referring to the screen shown in FIG. 3, 1303 indicates a container from which the user grants review & comment permission to family members and friends, specifically for this decision aid, regardless of permissions granted for other decision aids. To invite a family member or friend to review and comment on user-chosen goals and suggested results, a user follows a two-step process, where establishing and managing My Connections, described in FIG. 2A, item 1206, are treated separately from inviting others to view specific decision aids. Specifically, having a member within My Connections does not in and of itself permit the viewing of any domain/decision aid; rather, as a user adds or edits each decision aid, they have the ability to select, from a drop down list, which family member and friends—if any—they'd like to review and comment on that particular decision aid. This process is repeated for each decision aid, thereby allowing disparate groups to review and comment on different decisions. In this manner, a user may choose to keep a particular decision aid private, thereby preventing anybody listed in My Connections from reviewing it. The same user may choose one-or-two persons from My Connections to review another decision aid, and choose many to review a third. Furthermore, a user may choose to delete (remove) someone from viewing a decision aid for which they had previously extended an invitation, without permanently deleting that person from My Connections.

Still referring to the screen of FIG. 3, 1304 indicates a container enabling the user to select criteria of interest or self-relevance. The system then asks the user to qualify that selection as Less Important or More Important using a three-position control, as described via instructions indicated by 1305. Regardless of domain-type, the default value of the three-position control for Stated Importance is Not Important; a single click assigns the criteria a value of Less Important, and a second click assigns the criteria a value of More Important. For Single-Product Domains, Stated Importance values are used when determining which providers are Most Relevant, Relevant or Of Interest, and are used to value or devalue results. For Multi-Product Domains, Stated importance values of Less Important and More Important are treated equally—namely as a flag that the criteria/goal has been selected by the user. Specifically, as explained in greater detail below, for Multi-Product Domains, Stated Importance values are used for Intelligent Agent feedback and as reminders/cues to the user, versus weighing results/providers. Again, as explained in greater detail below, within this embodiment of the present invention, Multi-Product Domains results are weighed based on recurrent instances of products satisfying user-specified goals.

To achieve result relevancy, the system addresses common challenges of survey validity, including (i) low incentive to complete, (ii) perceived risk of responding truthfully, (iii) ego inflation, (iv) misinterpretation of queries, (v) lack of qualifying feedback during the survey, and (vi) mid-point, non-committal response to requested Level of Importance. Within the current embodiment, selected criteria confront these challenges directly, thereby dramatically improving reliability of user responses, and therefore of result relevancy. Specifically:

(i) Low incentive to complete. Users quickly recognize that the system's user-centric results are a function of user input: the more fully a user responds to the goal statements/queries, the more meaningful are the supplied responses.

(ii) Perceived risk of responding truthfully. Tied to item (i), users recognize that untruthful responses to goal statements/queries lead to results ill-suited to their wants & needs; only truthful response leads to applicable results. Within the system, there is disincentive to respond in any way but truthfully.

(iii) Ego inflation. The converse of item (ii). The system provides disincentive for ego inflation, as the result of such behavior is the return of ill-suited results.

(iv) Misinterpretation of queries. The system's Intelligent Agent observes user responses then provides Blog-style feedback regarding similar, dissimilar and potentially overlooked queries. Feedback is immediate and tailored to user action, thereby reducing the occurrence of query misinterpretation.

(v) Lack of feedback during the survey. Addressed in item (iv).

(vi) Mid-point, non-committal response to requested Level of Importance. The system's modified Likert scale, which is a three-state control of Not Important, Less Important and More Important, eliminates "middle-of-the-road" responses. Each query delivers binary certainly, with the first test being either Not Important (Ni) or Important, and the second test—applicable to those queries deemed Important—as a user commitment between Less Important (Li) or More Important (Mi). These conditions isolate user intention with greater certainty than do surveys allowing mid-point responses, since there is no "somewhat important" from which to choose. In each case, user responses will always satisfy one of two Boolean conditions: If $\neg$ Ni then (Li $\vee$ Mi) or If $\neg$(Li$\vee$ Mi) then Ni Finally, the screen of FIG. 3, at 1306 contains further instructions for saving user choices, then viewing Intelligent Agent feedback and recommended results.

Figure 4A:
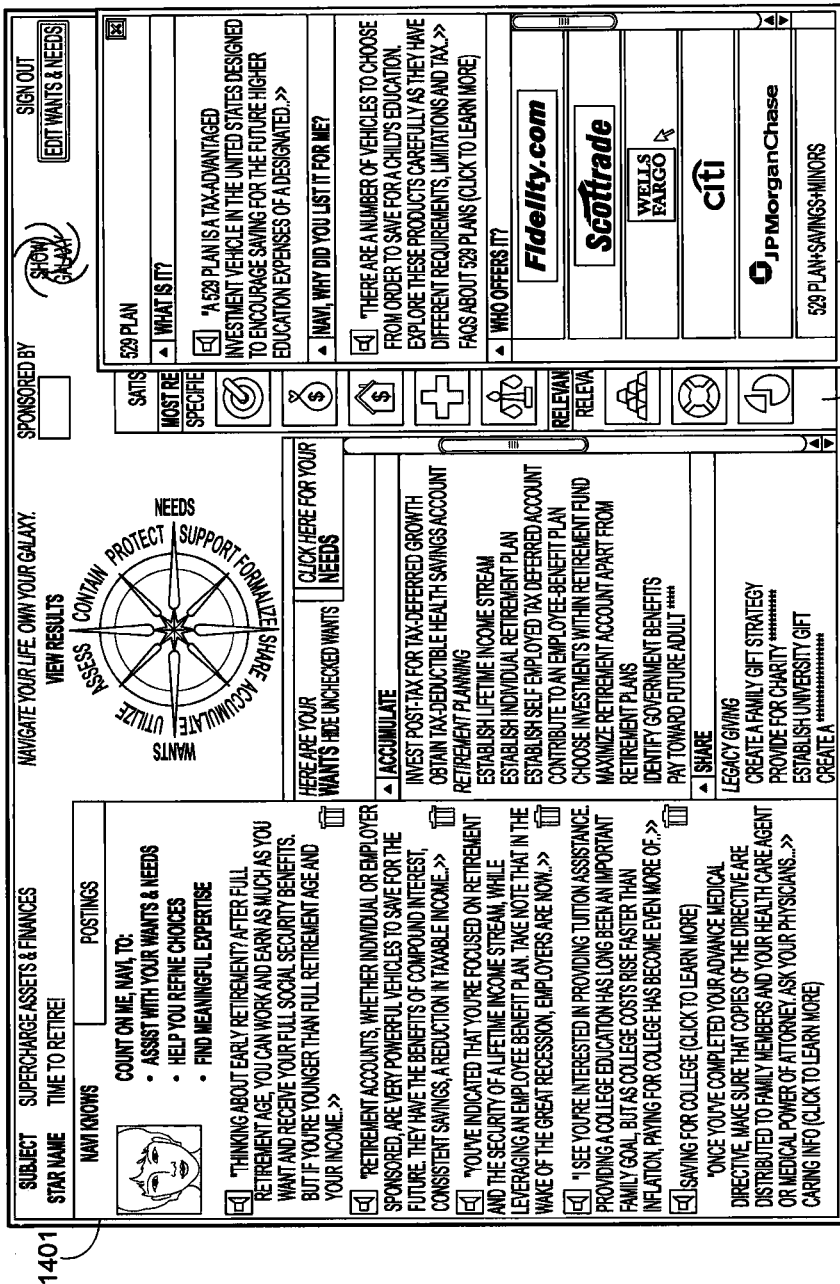

FIGS. 4A and 4B shows a graphical rendering of View Results, where 1401 enables a user to toggle between a Blog containing Intelligent Agent feedback, and social postings from family members and friends; however, if in FIG. 3, item 1303 the user chose to designate the decision aid as private, the social postings tab in 1401 is void of postings— its sole contents are instructions for granting review and comment permissions, via item 1303. In instances where a user ($U_N$) is deleted from reviewing any/all decision aid(s) of another user ($U_M$) at the same time that $U_N$ happens to be reviewing that $U_M$ decision aid, state-control within the system allows $U_N$ to complete commenting—and for those comments to be displayed; however, once $U_N$ exits the decision aid, he/she will be unable to access it again until re-invited by $U_M$—or in the case of having been deleted from My Connections, until re-established within My Connections by $U_M$.

Still referring to 1401, the Intelligent Agent's Blog contains no Relevancy headers, such as those used to display product results. Specifically, no mathematical calculation is used to sequence the display of Intelligent Agent feedback; rather, the display bears a 1:1 relationship to the sequencing of user-stated goals, which is static within an embodiment of the present invention, and is determined by content authors when goals are authored. In cases where two goals produce the same Intelligent Agent feedback, only the higher occurrence is displayed (this prevents a specific statement from being redundantly displayed in the same container, at the same time).

Still referring to the screen of FIGS. 4A and 4B. 1402 displays criteria that the user selected as described in FIG. 3, item 1304. Only chosen criteria are displayed, not their associated level of importance. The containers within 1403 and 1404 (FIG. 4A) indicate results of Multi-Product Domains, whereas the containers within 1405 and 1406 (FIG. 4B) indicate results of Single-Product Domains. Specifically, 1404 displays whenever a user clicks on a product label within 1403; and 1406 displays whenever a user clicks on a provider label within 1405. In this manner, intelligent Agent feedback and detailed result descriptions are extracted based on user action.

Indicators of Relevancy

Within the bottom of 1404 is shown a text container, indicating the output of the system's Internet/web Search String Generator. This generator produces ontological representations for all products that the system's Intelligent Agent recommends. When more than one goal triggers relevancy of a single product, the system displays a separate search string (via a drop down box) such that each search string contains the product name, plus the ontological representation of that goal. The search string, which is generated automatically by utilizing the system's ontological schema, may be overridden via a content author's manual edits.

If, for example, a relevant product is 529 Plan (Product P), and if 529 Plan has only one user-selected goal which triggered its placement within the relevant products subset, then a single search string is displayed, its contents dependent on the ontological representation of the user-selected goal—not of the product—for which an instance may be:

529 Plan+Savings Instrument+Support+Recipient+Minor, where
  Product=529 Plan,
  Class=Savings Instruments,
  Intention=Support,
  Attribute=Recipient, and
  Sub-attribute=Minor However, if Product P's placement within the results subset was triggered by multiple user-selected goals, then multiple search strings are displayed, their content dependent on the ontological representation of those user-selected goals.

Figures 5A, 5B:
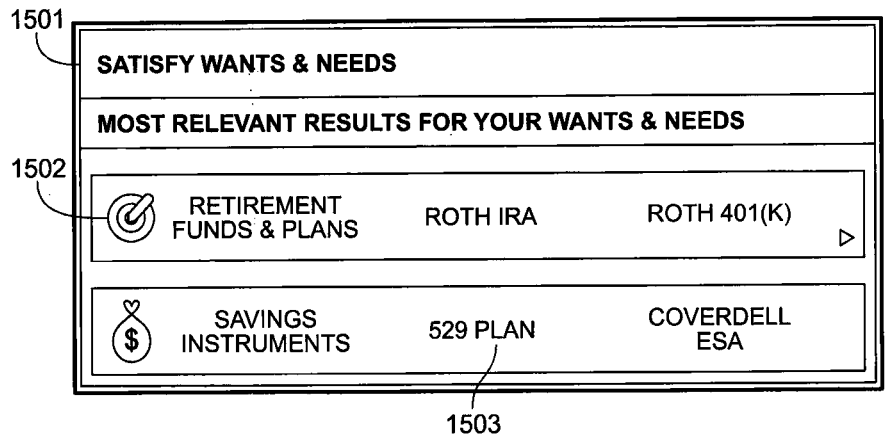
FIG. 5B also shows an embodiment of logic used to manifest content display.

The relevant products container shown within context of the user interface in FIG. 4A, item 1403 is enlarged in FIG. 5A, item 1501. Within 1501, products are grouped by class-type (or product family) then displayed within their product family (as shown in 1502) beneath Most Relevant or Relevant labels. In this manner, products can be bundled in a way that is meaningful to users. Specifically, product families, which are synonymous with the ordinate Class within the system, are used to count the occurrence of like products. In this manner, a relevant products (RP) subset containing three products ($P_1$, $P_2$, $P_3$) that are all ontologically codified as Class M ($C_M$), will give $C_M$ a count of 3; within the same relevant products subset, two products ($P_4$, $P_5$) ontologically codified as Class N ($C_N$), will give $C_N$ a count of 2. When displayed in the results container, $C_M$ along with product family members $P_1$, $P_2$ and $P_3$ will precede $C_N$ and its product family members $P_4$ and $P_5$. Within the system, product family occurrences translate into degree of relevancy for each product family. When applied to the interface rendering within FIG. 5A, these class and product designations become:
  $C_M$=Retirement Funds & Plans
  $P_1$=Roth IRA
  $P_2$=Roth 401(k)
  $P_3$ not shown, see note below
  $C_N$=Savings Instruments
  $P_4$=529 Plan
  $P_5$=Coverdell ESA For certain embodiments of the user interface, real estate limitations may restrict the display of products per family, resulting in the need for a user control such as the arrow next to Roth 401(k) in 1502—such user controls indicate to the user that additional products, in this case $P_3$, are also placed in the results basket for the product family called Retirement Funds & Plans. In further explanation, still considering the relevant product subset containing the following five products:
  401K
  Roth IRA
  Social Security
  Spousal IRA
  SIMPLE IRA The product family common to these products is Retirement Funds & Plans. For this example, additional products within the example relevant products subset are:

Fixed Annuity
Variable Annuity for which the product family is Annuities. The results engine continues to count products within their product families, then displays product families in descending order of occurrence. Within the system, administratively-set thresholds may be used to further designate whether a product family is displayed beneath the Most Relevant or Relevant label. For instance, within Multi-Product Domains, an embodiment of the present invention sets the number of Most Relevant families at a default value of five (5) families. In instances where no more than 5 families are relevant, then no Relevant label is displayed. Further, only Most Relevant and Relevant categories are meaningful in Multi-Product Domains since mathematically, results cannot be returned without some degree of relevancy to the user; therefore, all products outside Most Relevant fall into the Relevant basket, grouped by family in descending order of goal-to-product count. Eliminating Of Interest applies to the Market Links tab of Single-Product Domains as well, since the Market Links container utilizes the system's Multi-Product method to calculate and display results. Referring still to FIG. 5B, a table is shown indicating relevancy display for Multi-Product Domains; here, a depiction of products, product families and placement within relevancy baskets is presented, where:

1. Relevant Products (RP) is the subset of products identified by intersecting the Potential Relevant Products set (PRP) with user-stated goals
2. # TRUE refers to the number times a particular product is identified via the PRP and user-stated goals intersection
3. Count is ALWAYS shown as 1, since # TRUE per product does not factor into relevancy placement (all that matters is that the product has been identified for display)

Given the example threshold of 5 families per Most Relevant categorization, all but $F_8$ are displayed as Most Relevant. Since each of $F_{12}$, $F_{11}$ and $F_5$ contain a single product within the relevant product subset, there is no mathematical rationale as to why $F_8$ (rather than $F_{12}$ or $F_{11}$) falls into the Relevant basket, other than it is the last family identified during processing. Likewise, there is no mathematical rationale as to why $F_4$ displays before $F_9$ within the Most Relevant basket, other than family $F_4$ was identified during processing prior to family $F_9$—however, the presence of Persona-type triggers based on self-learning algorithms, may promote $F_9$ over $F_4$. Finally, still referring to the table shown in FIG. 5B, if relevancy were calculated according to # TRUE per product, sequencing of products would be: $P_{121}$ with 3 occurrences, followed by $P_{24}$ with 2 occurrences, followed by all other products with 1 occurrence each. However, despite $P_{24}$ enjoying 2 occurrences, it is listed lower than seven products with single occurrences—products that benefit from being in families containing more RP products than $F_{12}$ (the family for $P_{24}$).

Now referring to the Multi-Product display shown in FIG. 6, any Intelligent Agent feedback tied directly to products (displayed in an embodiment of the present invention beneath the "Why did you list this for me?" label at 1404 of FIG. 4A), is displayed along with the product—and therefore is tied to the relevant products (RP) subset intersection with user-stated goals, which dictates relevancy display for products. If a single instance of Intelligent Agent feedback is used for multiple products, then it is displayed for each of those products; within the system, this repeated display is not considered redundant, since it can never appear visually in the user interface at the exact same time. In further detail, still referring to FIG. 6, content beneath "Why did you list this for me?" is generated automatically by a token-based (variable) hash routine, or represents Intelligent Agent feedback written by content authors. In each case, content is extracted based on combinations of user-selected criteria being true. The presence of authored qualifiers overrides display of any automatically-generated qualifiers, since authored qualifiers contain more robust feedback than machine-generated content.

Adaptive & Non-adaptive Methods

Within the current embodiment of the invention, each self learning method becomes an additional Internet/net search results filter. As such, the results routines allow for filters to be added, removed or modified without changes to untouched filters. Adaptive algorithms within the system are based on action and inaction of each user, as well as representative behavior (Persona-type X) for each user. The outcomes of these algorithms are refined Intelligent Agent suggestions (that is, a reduced set of statements, products & services deemed relevant to the user). Algorithmic categories applied to the system's Intelligent Agent include those shown in FIG. 7, such as the agent's ability to learn to (i) ignore, (ii) append, (iii) befriend, (iv) suggest, (v) refine and (vi) be current.

Adaptive & non-adaptive methods are applied to the system's neural network engine. Non-adaptive methods drive the neural network engine's connectionistic behaviors—that is, the mapping of inputs to relevant results. The adaptive methods focus on Persona-types assigned to like-users, and are implemented via a threshold-assigned similarity in profile attributes and stated Wants and Needs. Each Persona-type then filters the displayed results, thereby refining results to reflect behaviors captured within the Persona-type. Finally, an embodiment of the present invention enables business-rules to dictate when the neural network engine performs self-adjustments, whereby for any filter $F_1$ the input and/or output nodes of the neural network assimilate the properties defined by $F_1$. This progression of i) non-adaptive, to ii) adaptive via filters, to iii) fully self-adjusting, enables business-driven thresholds and rules to dictate modification to the neural network, rather than granting it organic behavior. Semi-automatic updates allow transformation of the network, without encountering ill consequences inherent in automatic updates being contemplated for AI systems.

The system's filtering method inherently accounts for both high- and low-frequency, enabling the filtering-out or demotion of low-frequency concepts, and the promotion of high-frequency concepts. For each Concept N, filtering is a function of the frequency of $C_N$ ($\Sigma$ of $C_N$ clicks enacted by a Persona-type) as compared with frequency of each related concept within the set $C_{[M\ldots Z]}$. Filtering within the system also occurs at the Product Family level, where Product Family is synonymous with the construct Class, allowing removal, demotion or promotion of a Product Family results based on frequency of Persona-type access. Multi-Product Domain results, beyond being based on an ontological match to user queries, are affected by any Persona-type discounting/promoting methods.

Use of Persona-Types

Within the system, Persona-types form automatically through implicit user-behavior and explicit user-response. Implicit cues include i) selection of criteria under Wants & Needs, and ii) clicks on Intelligent Agent feedback, links and products. Explicit cues take the form of "interest/satisfaction" checkboxes labeled—Save and —Share.

The system's—Save checkbox is located next to each intelligent Agent feedback and resulting product. Whenever a user checks—Save, a link to that content appears in the—Save container, facilitating future retrieval, review & action by the user. The—Save container is available via the home page (FIGS. 2B and 33-f), displaying links to all content that a user has flagged for future review—regardless of whether the user has modified Wants and Needs and possibly removed the content from coaching and results containers for a specific domain.

The present system's—Share checkbox is located next to each product. Whenever a user checks—Share, a link to that content appears in the user's "Postings" blog, with an automatic statement asking family & friends to review the product and provide comments. Family & friends can click the link within the blog to review the product, which may no longer appear in the results container if the user has modified Wants & Needs. When family & friends click the link, data analytics regarding usage/review/access are updated.

With the system's—Save and —Share capabilities, user interest/satisfaction is gauged without interruption of "How satisfied are you with this page/product?" or "Is this a page/product you would share with a friend?"—queries that are commonly used to solicit explicit feedback, at the risk of annoying and losing the user; rather, the system's—Save and —Share are tools provided for the user's benefit, facilitating review & sharing of content. A by-product of the tools is input for Persona-types, therefore triggering update to the neural network engine and to data analytics. Beyond capturing the user's interest in flagged products, —Share captures frequency of access by family & friends, which is valuable marketing data for product providers.

A second use of the system's Persona-type involves development and measurement against pre-established baselines, used to validate marketing or other external assumptions. In such uses, Persona-type $P\mu$ is established as the expected norm and held constant; $P\mu$ is then compared with a sample of users within a specified user-profile, enabling sample standard deviation ($\sigma$) analysis from baseline expectations. For a sample set $[U_1, U_M]$, comparing the actual standard deviation value of $U_1$ and $U_M$ to $\sigma$, which the sample baseline would necessarily value at $\sigma=U_1-P\mu=U_M-P\mu$ becomes a valuable tool to validating or challenging previously held beliefs.

Figure 8:
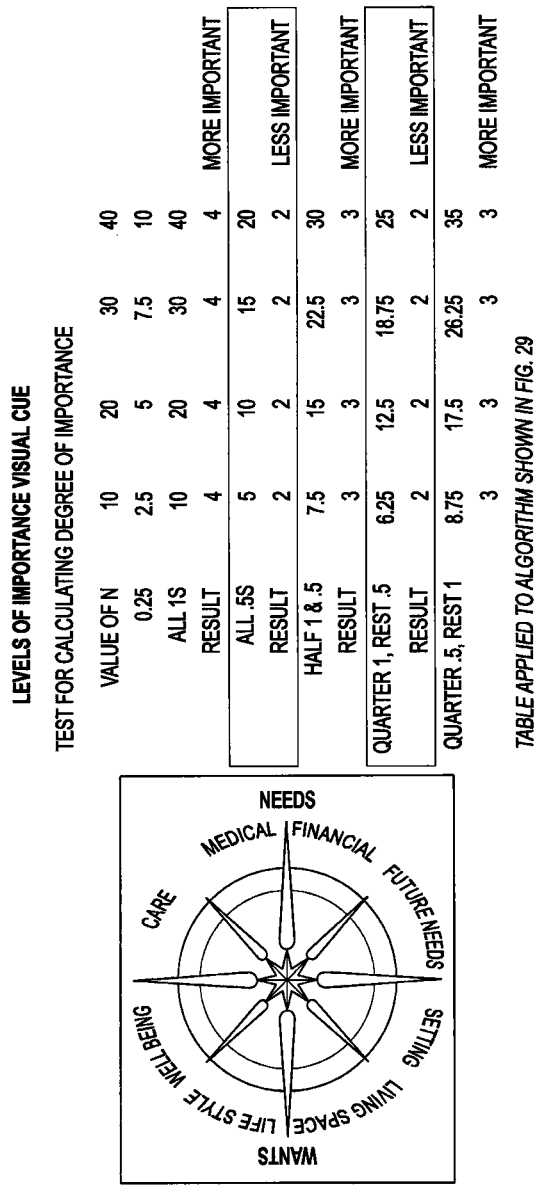
FIG. 8 displays a graphic and a table; the graphic represents a visual cue, presented for end-user benefit, that summarizes user-stated level of importance; the table represents test cases for calculating Overall Stated Importance values.

The graphic shown in FIG. 8 summarizes, per Want category and Need category, user-stated level of importance. An algorithm applied to underlying criteria is used to generate a visual cue indicating whether the user weighed the category higher or lower in overall importance; effectively, the three-position control for user-stated level of importance results in a visual reminder to users and their invited friends & family, as to what's important to the user. Still within FIG. 8, a table displays test cases for the algorithm, an embodiment of which appears in FIG. 19.

Figures 9, 10:
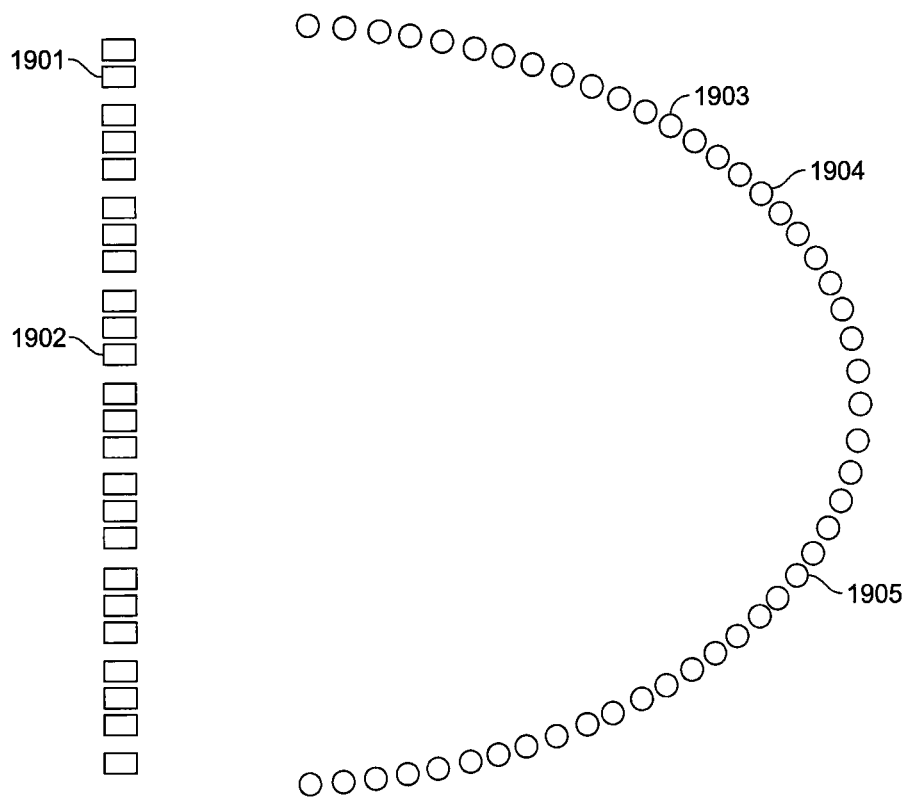

FIG. 9 visualizes output of the Multi-Product Domain method, wherein a neural network utilizes a proprietary "Is-a" based ontology that, although exact in structure across subject areas, contains unique identifiers for each domain, thereby enabling the mapping of user selected criteria (1901 and 1902) chosen from eight categories of Wants and Needs, to related products and services (1903, 1904 and 1905). The engine is required to effectively map the superset of Wants & Needs (alternately referred to as selection criteria, goals or queries) to the superset of products, producing a Potential Relevant Products (PRP) subset—in effect, the neural network engine mathematically isolates all selection criteria that share an ontological relationship with any given product, then uses those matches to display relevant products along with Intelligent Agent feedback. Still referring to FIG. 9, an example universe of 24 criteria (boxes shown on the diagram's left-side), and of 49 Products (bubbles forming the half-oval on the diagram's right-side), yields a possibility of $2^{24}*2^{49}=2^{73}$, or 9.444733 e+21 unique matches. While only a subset of that number may represent meaningful real-world matches, each combination must be evaluated to determine if it is relevant or not—a task well beyond human capability to tackle, considering that the possible matches are effectively countless. Furthermore, this illustrative universe is small compared to real-world numbers that may comprise hundreds of criteria per domain (as opposed to 24), and hundreds of products per domain (as opposed to 49).

Neural Network Engine Output

Now referring to the table shown in FIG. 10, the system's neural network engine functions offline. Although its output is necessary to generate relevant results for users, the engine itself does not run during a user session. The file produced by the neural network engine, which is then accessed runtime to determine user results, is an M×N matrix of Potential Relevant Products (PRP), where M represents the total number of products within the universe $P_U$, and N is the total number of criteria (or goals) within the universe $G_U$, such that each column corresponds to a goal. Specifically, the value in cell $P_1G_5$ is true when the N×1 matrix for $P_1$ multiplied by the N×1 matrix for $G_5$ equals the N×1 matrix for $G_5$. One embodiment of this method is a linear algebra equation revealing the result of true if $[P_1]*[G_5]=[G_5]$; stated broadly, result R of multiplying two binary matrices P and Q equals matrix P only when matrix P is a true subset of matrix Q. Applied to multiple goals and products, this can be further represented as;

Potential Relevant Products (PRP)=Subset of Products $(P_K \ldots P_M)$,

Where for Products $P_1 \ldots P_Z$ and for Goals $G_1 \ldots G_N$,

Binary relationship of the ontology of each Product (P), multiplied by

Binary relationship of the ontology for each Goal (G), exactly equals

Binary relationship of the ontology of that Goal (G)

Effectively, PRP is an extraction of products that are ontologically aligned with goals; this extraction method is used within Multi-Product Domains to produce the PRP, and within Single-Product Domains to identify Potential Market Links (PML). The first row within FIG. 10 indicates PRP size, execution timing and purpose. Beyond being the set from which relevant products are calculated for each user, the M×N matrix of Potential Relevant Products is utilized by content authors to write Intelligent Agent feedback based on Goal-to-Product relationships defined within the M×N matrix. Still referring to FIG. 10, the PRP solution set is produced using the same method that calculates the Potential Market Links (PML) solution set; the PML is required by Single-Product Domains to determine which goals map to which Market Links (consumer retail products). The third row within FIG. 10 indicates PML size, execution timing and purpose. Now, still referring to the table for FIG. 10, Relevant Products (RP) is a subset of the PRP solution set, and is calculated runtime based on the intersection of goals selected by a user, and those products within the PRP that are associated with user-selected goals. RP is produced using the same method that calculates the Relevant Market Links (RML) subset within Single-Product Domains, used to determine which Market Links within the PML solution set are associated with user-selected goals.

Finally, Relevant Results (RR), not shown in FIG. 10, is a solution set calculated for Single-Product Domains. The RR set is produced by a series of percentage-based calculations that are then devalued based on user-stated level-of-importance for the criteria they select.

The inference algorithm that drives neural network engine mapping is used solely to map goals to products; however, separate methods are used to execute intra-mapping of products and goals. For Product-to-Product mapping (P2P), a binary matrix (1×N) multiplier method fails to produce real-world results: while this method can produce a subset of results mathematically, its outcome inadequately reflects relationships produced through human cognition. To isolate P2P similarities, the system uses a derivative method of the one that generates Single-Product results. Rather than return subsets, this method calculates "percentage fit." This P2P capability becomes an important machine self-learning opportunity: enacting this method allows the Intelligent Agent to comment on related products, and to return "near products" that Goal-to-Product mapping does not return. Beyond the machine self-learning benefit, this method reduces the need for content authors to create additional (though minimally dissimilar) goals to point to products not currently returned via the M×N matrix. Using this method, the system's Intelligent Agent is essentially saying, "The similarity of this product is so strong to another product I've suggested, that I am including it with your results"

Goal-to-Goal mapping (G2G) within the current embodiment of the invention utilizes a method supplemented by human assistance: for any goal chosen by a content author within the system's Content Management System, all other goals that contain the same class but different subclasses are displayed to the author. This display is an indication to content authors that goals may be contradictory, or that Intelligent Agent feedback should be written to clarify (dis)similarity of the goals.

No logic beyond that used to produce the Relevant Products (RP) subset shown in FIG. 10 will remove products from the PRP set. However, user-specified filters and Persona-type filters may reduce the results subset by removing content deemed irrelevant, either by the user or by machine-learning algorithms. Furthermore, Intelligent Agent feedback identifying contradictory goals, produced automatically or written by content authors within the Content Management System, encourage the user to deselect goals, which in turn may have the effect of removing contradictory products. This approach places decision-making with the user. Rather than allow the inference engine to remove products of a contradictory nature (an action that, without further contextual input from the user, may produce erroneous results), the Intelligent Agent prompts the user to conduct "housekeeping" on selected goals, thereby further removing products returned to the user.

Ontological Schema

Dissimilar to employing ontological triples, which leverage noun-predicate-object schemas to extract natural language context from various inputs, the system's ontological schema is structured specifically to facilitate the conceptualization of decisioning, with the ontology's two primary constructs being Classes (with Super Class, Class & Subclass subsumption) and Attributes (with Attribute and Sub-attribute subsumption); these constructs are "hinged" by Intention, which forms the core of human decisioning. Such a schema provides less cognitive challenges for content authors utilizing the ontology, thereby reducing authoring errors that are common with complex ontologies, yet providing the power of linking concepts (for instance, goals to products) across specified domains. Within this structure, goals are equivalent to queries, while products become targeted objects of those queries. Within the system, the ontological structure for products mirrors the ontological structure for criteria, or goals; however, they differ regarding the minimum and maximum number of identifiers used to classify each. Specifically, the restriction placed on goals mathematically forces goals to be a potential subset of products, such that for the universe of goals ($G_U$) and products ($P_U$), instances of goals ($G_K$) exist which are subsets of products ($P_K$), so that $G_K \subseteq P_K$. Given requirements for Minimum & Maximum Identifiers shown in FIG. 11, a goal will always have 1 Intention and 1 Attribute, but may have 0 of the remaining identifiers; a product will always have at least 1 of every type of identifier. Regarding sub-ordinate relationships:

i) Super Class is sub-ordinate to nothing
ii) Class is sub-ordinate to Super Class
iii) Subclass is sub-ordinate to Class
iv) Intention is sub-ordinate to nothing
v) Attribute is sub-ordinate to nothing
vi) Sub-attribute is sub-ordinate to Attribute This schema generates output meaningful to humans by enabling machines, via subset calculation, to link richly-defined products to singly-defined goals. Within the system, methods by which subsets are extracted include linear algebra methods, such as multiplication of binary matrices. When authored, goals need to be purposefully exact—versus being compound or linguistically complex. It is within the combination of singly-defined goals that complexity lies, but combination of concepts is handled by the machine, not the user, therefore reducing human cognitive load and increasing the machine's ability to isolate human intention, contradiction and validation.

To further illustrate the relationship between goals and products, FIG. 12 visualizes sample product N ($P_N$), along with sample goals A, B and C, shown as $G_A$, $G_B$ and $G_C$. Within the diagram, 1×N matrices allow a mathematical result of true when specific instances of products and goals (I), result in $[P_1]*[G_1]=[G_1]$. Matrix multiplication shows that the ontological encoding of $G_A \subseteq P_N$ and $G_C \subseteq P_N$; however, the selected intention within $G_B$ (identified in FIG. 12 with an x) prevents it from being a subset of $P_N$, such that $G_B \subset P_N$. During content authoring, the system's Content Management System automatically activates an ordinate whenever a content author selects a sub-ordinate; such auto-classification ensures that meaningful subsets are not dismissed (a risk that could occur if content authors were responsible for manually tagging subsumption). In the example domain of Financial Assets, a content author may select the Subclass Term Insurance when classifying a goal or a product; in this case, the system's Content Management System automatically activates the Class Life and Super Class Insurance. If a content author selects the Sub-attribute Tax-free Growth, the system's Content Management System automatically activates the Attribute Tax-related. The system's ontological schema facilitates behavior mining; specifically, goals and intentions (where intentions are synonymous with Want and Need categories, and are reflected 1:1 within the ontology as Intent) intrinsic to user experience are codified with every click, eliminating commonplace predictive modeling that is based on disparate, non-contextual clicks. Within the system, the user is stating behavioral intent, the tool is aggregating & cross-validating those stated intentions; in such a model, semantics enjoys a one-to-one relationship with user action. Pitfalls of prediction are removed. Data analytics are not based on browsing behavior, but rather on stated intent as an explicit qualifier to selected criteria or implicit clicks. Importantly, semantic equivalence of goals and products is achieved by classifying both against the same domain-specific instance of the ontology. Finally, instances of contrary concepts (both goals and products) are discovered automatically by using "is-not-a" qualifiers. Attached to attributes, these qualifiers flag opposing concepts.

The system's ontology represents concepts such that machine-based methods can produce meaningful conclusions—specifically to facilitate human decisioning in compressed timefriames and with more robust connections than is otherwise impossible without inordinate human effort. The system's ontology is architected to span domains without violating the underlying meta-model or schema—that is, modeling of domains within the system follows a standardized schema versus requiring disparate ontological structures per domain. Genesereth and Nilsson's 1987 definition of domain conceptualization postulates that for domain D, a set of relations R holds unique meaning, and is represented as <D, R>. Modeling within Genesereth and Nilsson, disparate domains leverage varied taxonomic, non-taxonomic, partornomic and instantiated relationships; effectively, domain drives structure. Within the present system, however, this one-to-one hypothesis is challenged, such that structurally:

$$<D_1,R>=<D_M,R>=<D_N,R>$$

Although concepts within the domain differ, as do the number of taxonomic (is-a) relations per construct, the system's meta-model is a standardization for which $<U_D, R>$, where $U_D$ the universe of domains, and R is a standardized representation of those domains, differing only in domain-specific keywords and subsumptive occurrence per construct. Importantly, the ontology's structure and construct-types do not morph with the domain; rather, structure and construct-types are constant—set at Class, Intention and Attribute—and bearing a rule base for how to apply concepts to those constructs. Within the discipline of decisioning, this rigidity facilitates consistency, scalability and delivery of meaningful decision-ready results—effectively, the system's reliance upon $<U_D, R>$ facilitates machine-aided decisioning without tackling the standardization of extraction, pruning and refinement of broader human knowledge (Maedche & Staab, 2001). The system's ontology leverages both taxonomic and non-taxonomic constructs: taxonomic being Classes and Attributes, and non-taxonomic being intentions. Importantly, the non-taxonomic construct serves as a relational bridge between the two taxonomic constructs, ensuring human intent is captured and applied to neural mapping. Absent this construct, the number of products mapped to user selected criteria would escalate, becoming encyclopedic versus user-centric.

Content Management System: Use Cases & Permissions

Figure 13:
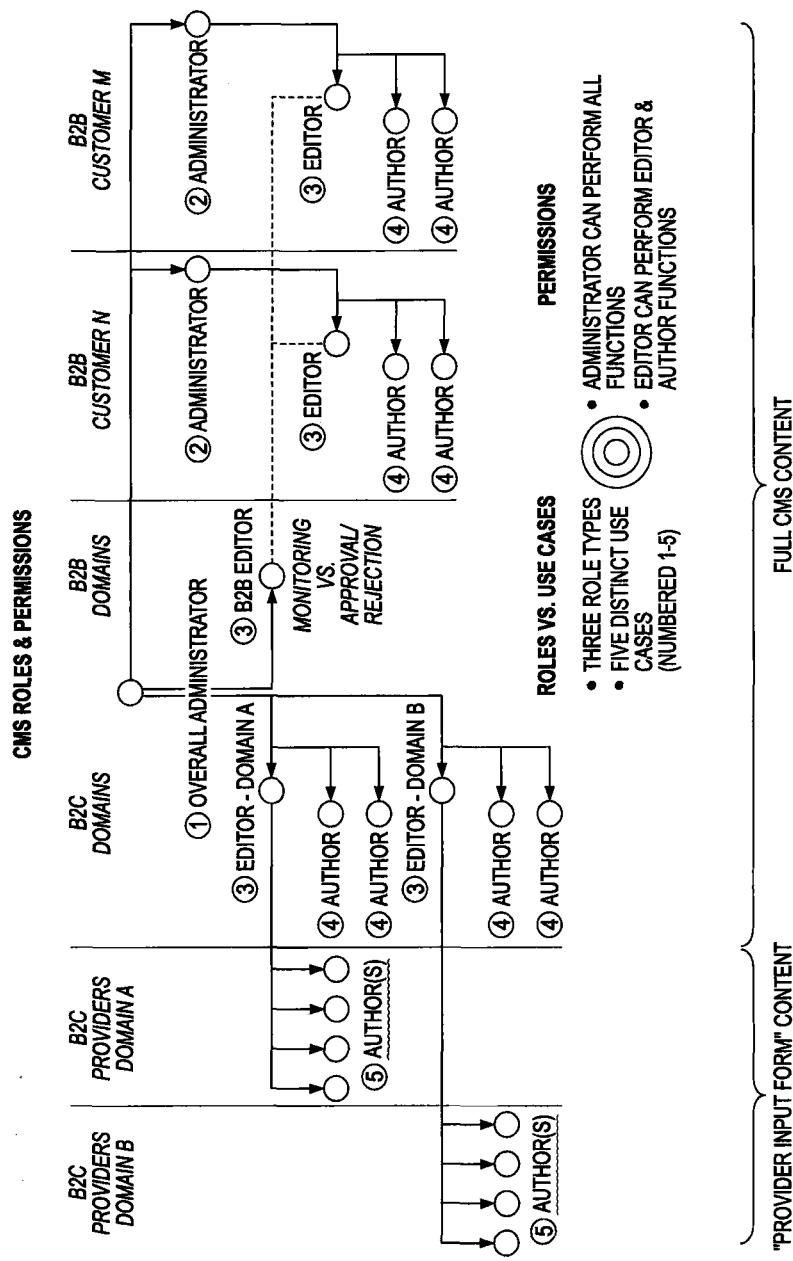

The system's Content Management System (CMS), illustrated in 1108 in FIG. 1 and as indicated by FIG. 13, satisfies three (3) roles: Administrator, Editor and Author. However, the number of Use Cases is five (5), as the CMS supports two types of Administrators and two types of Authors. One person may fulfill multiple roles; for example, within business-to-consumer (B2C) domains, one person may serve as Administrator, Editor and Author. Likewise, within business-to-business (B2B) domains, a corporate customer may collapse the roles of Administrator and Editor. Relationships between roles shown in FIG. 13 are described as 1—Overall Administrator This use case contemplates an overall administrator for the CMS tool, spanning all domains, both B2B & B2C, and having authority over all CMS users. The Overall Administrator will be able to add or remove users of the CMS, and to perform all functions available within the CMS.

2—Corporate Administrator (B2B) This role exists so that B2B customers have the ability to assign administrative ability to someone who may not have content editing expertise; however, for corporate customers, the same person likely performs the roles of Administrator and Editor Administrators are able to add or remove Editors and Authors, and perform all functions of those roles.

3—Editor The primary function of the Editor is to update the status of content from pending to either approved or rejected. The Editor serves in a traditional editing role, and has authority to syndicate authored content to qualified reviewers (Subject Matter Experts) such as functional supervisors, legal professionals, marketing personnel and members of R&D. A Domain Editor may designate Subject Matter Experts edit the content directly within the CMS (thereby avoiding the need to copy/paste content into third-party communication tools), by having the Administrator add the Subject Matter Experts, and grant them Editor status.

4—Full CMS Author Within a domain, Full CMS Authors add content; likewise, they mark existing content as updated or slated far deletion. Since these authors do not directly post updated or deleted content, the production files are secure from erroneous/accidental edits. Full CMS Authors have permission to modify content that they did not originally author, since quality control (editor approval) ensures validity of modifications.

5—Provider Input Form Author Within B2C domains, product information is largely supplied by providers. To fulfill these data requirements, providers log into a Provider input Form, and designate via clicks which items they provide. They also provide, via data entry boxes, text that summarizes and qualifies those offerings. Provider input Form Authors do not have access to the CMS.

Figure 14:
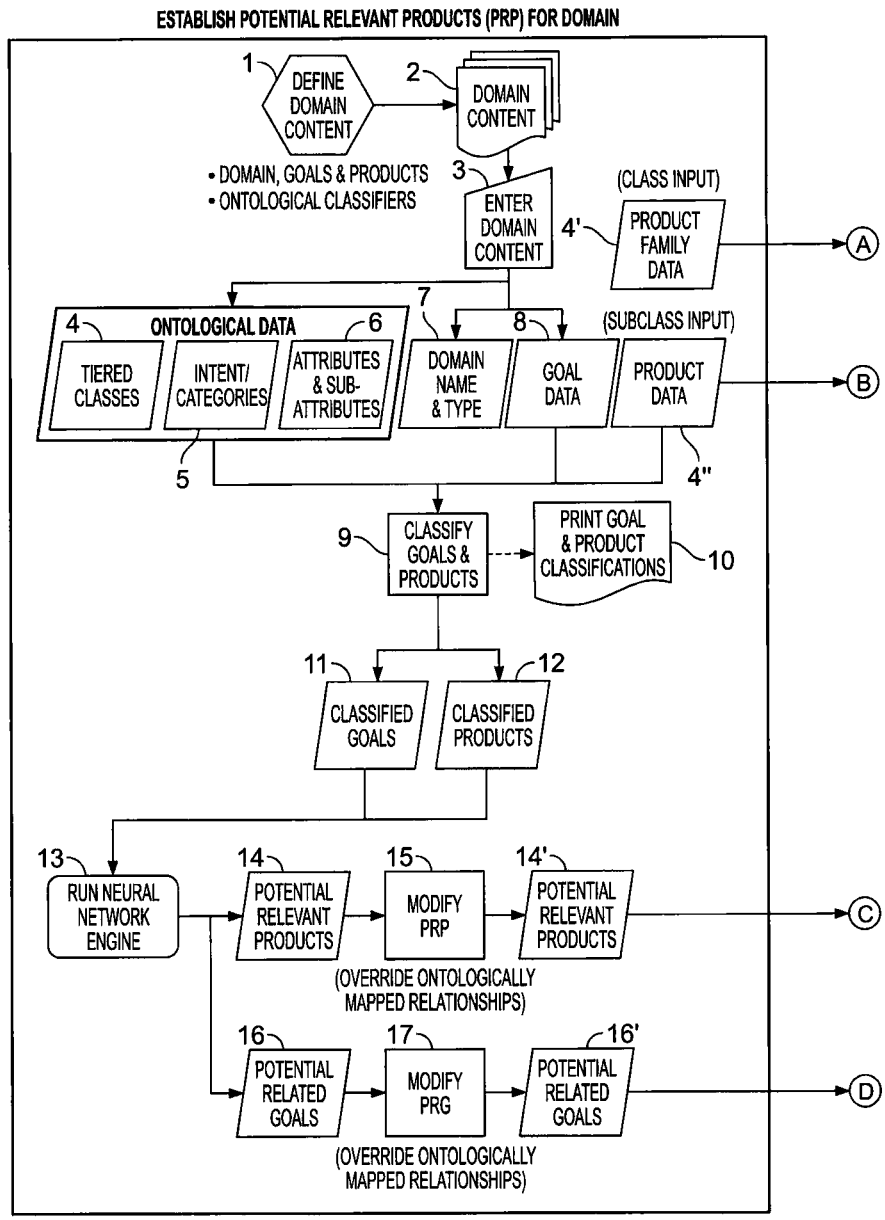
Figure 14:
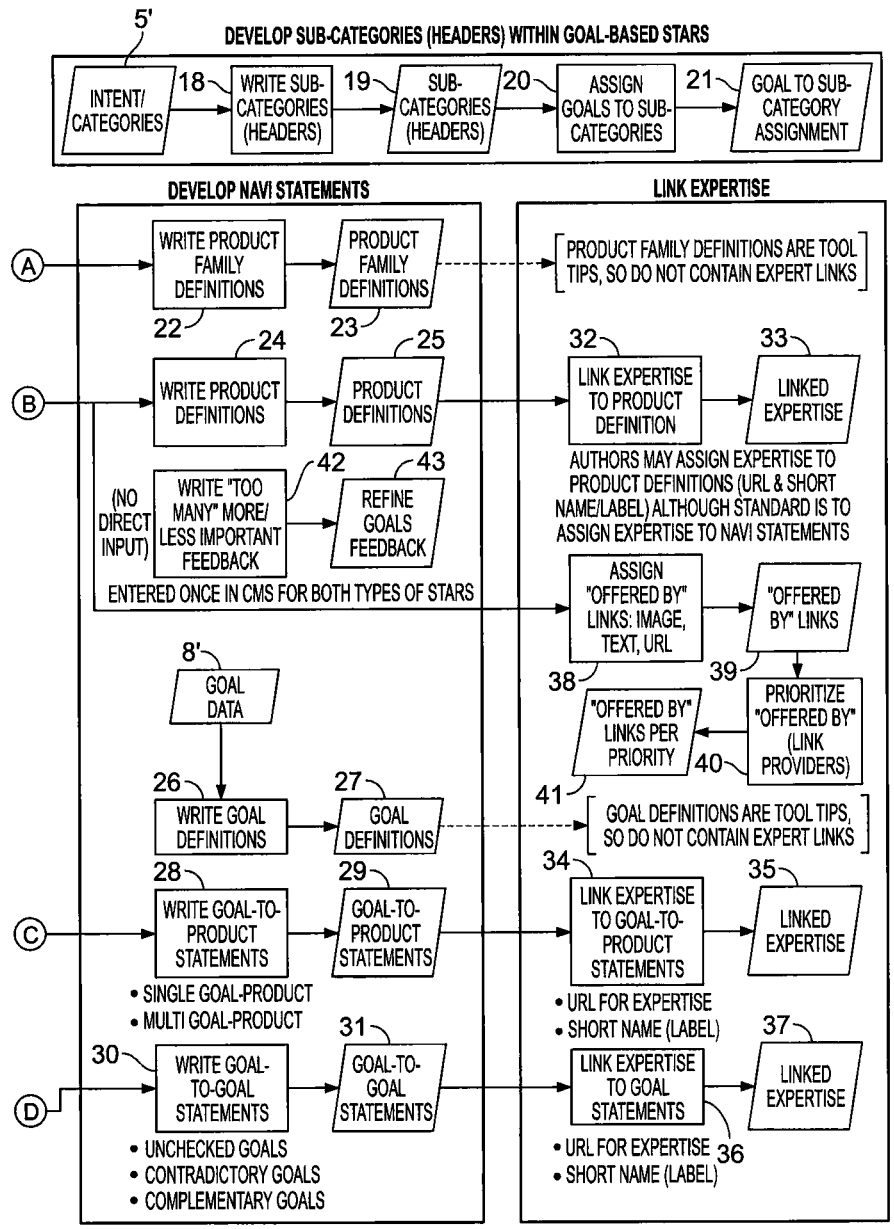
Figure 15:
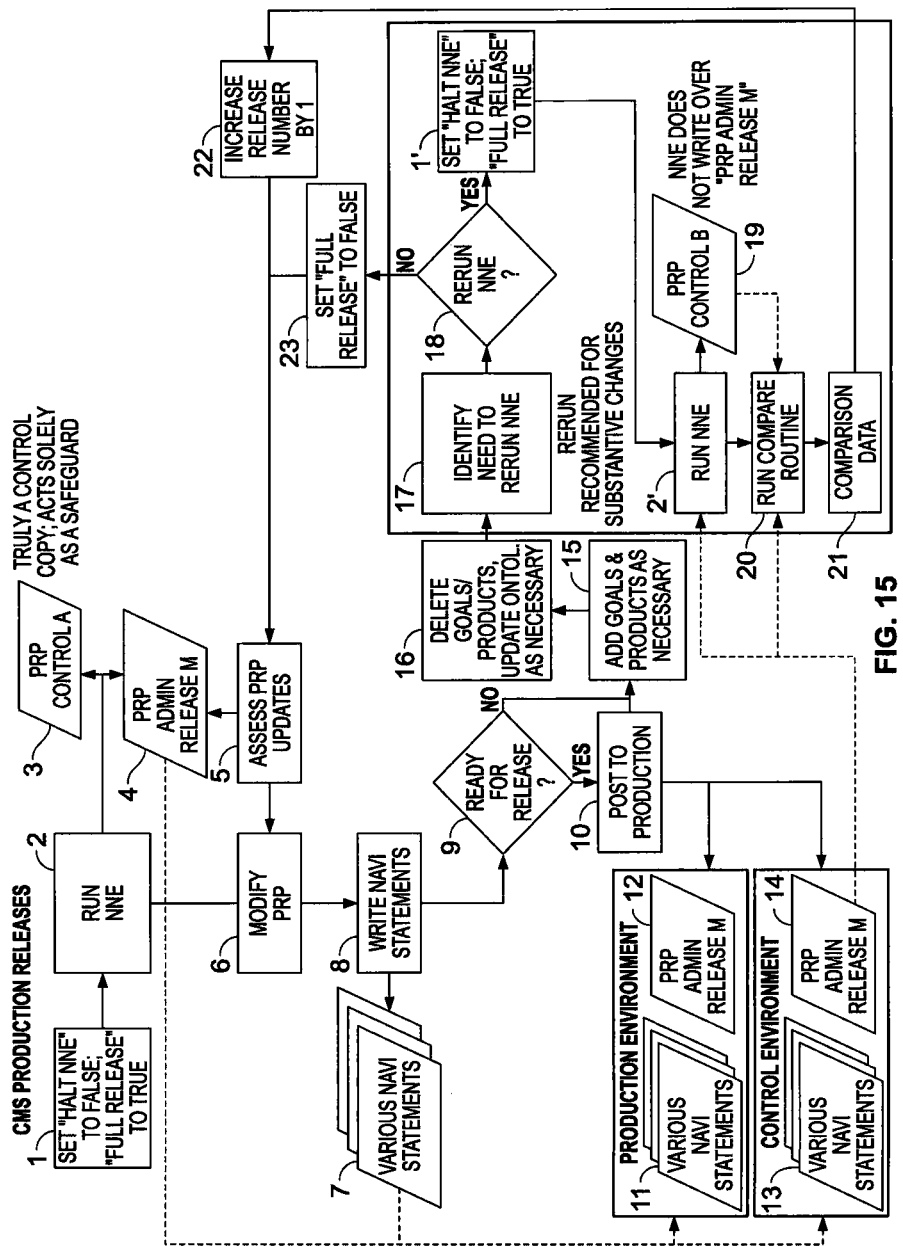

Still referring to the system's Content Management System, within FIGS. 14 and 15 are shown logic flows. The data inputs, processes, decision points and outputs within FIGS. 14 and 15 are represented with fully contained descriptions, such that persons reasonably versed in reading logic flows may recreate the system's CMS functionality.

Authoring Goal-to-Product Statements

Now, referring to FIG. 16, authors may write a variation of Goal-to-Product Statements. The following sample shows three Goals mapped to a single Product:

| Related Goals | | | | | |
|---|---|---|---|---|---|
| Product 1 | Goal 1 | Goal 2 | Goal 3 | All | Any |

Using Boolean operators AND (^) and OR (∨), along with the condition of YIELDS (⇒), a sampling of three goals mathematically yields 7 potential Product-to-Goal relationships ($2^3-1$); however, beyond these 7, an author may write additional Goal-to-Product Statements by developing multiple statements for any single condition. Therefore, given goals $G_1$, $G_2$, $G_3$ and product $P_1$, an author may choose from the conditions in FIG. 16 when writing Goal-to-Product Statements. The formula for Goal-to-Product conditions is as follows: for any number of goals (N) which map to a product (P), and for any number (0 to M) of statements (K) that an author may choose to write which are redundant, the possible number statements is $(2^N-1)+K_{0...M}$. So for a situation where a product has only 1 goal mapped to it, binary analysis dictates: $(2^1-1)=1$; the only viable condition is "G⇒P." Beyond writing a statement for this condition, the author may write 0 to many additional statements for this same condition (done so when a single statement becomes lengthy, or when the author/editor believes that the complexity of the Goal-to-Product relationship warrants more than a single statement). In a second example, where a product is mapped to 4 goals, binary analysis dictates: $(2^4-1)=15$ unique conditions; beyond choosing from these 15, an author may redundantly represent $K_{0...M}$ statements. Regarding display of Goal-to-Product statements, all statements that have been written for a particular product are displayed with that product; no logic within the system reduces/limits the number of statements presented to the user.

Auto-Generated Intelligent Feedback Statements

Within the system, automatic statements display whenever a content author has NOT written a hybrid or custom statement. In the present embodiment of the current invention, random-hashing of up-to 5 variations reduces the sense of the Intelligent Agent being "robotic." Automatic Intelligent Agent feedback exists for two Goal-to-Goal conditions: 1) Contradictory and 2) Unchecked Goal. Automatic Statements are meaningful for contradictory conditions since, in most cases, an author need not name specifics of the contradiction, only that it exists, therefore, an auto-statement suffices. The same holds true for Unchecked Goals: often, an author need not elaborate on the similarity of an Unchecked Goal, since the similarity is apparent in the goal's wording. However, within the system, automatic statements are NOT used for Complementary Goals, since the purpose of identifying such goals is to highlight their similar nature with additional, customized coaching. Complementary Statements are used to focus a user on repeating themes within their stated goals, and therefore bring focus as they consider results. Goal relationships specified within Unchecked Goals mirror those used to develop Complementary Goal Statements, since the sole difference is that, in the former instance, the user has failed to check a related goal, whereas in the later, the Intelligent Agent is commenting on the relationship of the selected goals. Within the system, contradictory auto statements are limited to discussing 2 related goals at a time, variations of which are displayed in FIG. 17.

Within the system, the following rule is executed when displaying Unchecked Statements: once an Unchecked Goal is identified, that Unchecked Goal should not be identified again. For example, if an author identifies that goal 1 is related to goal 2, and also identifies that goal 4 is related to goal 2, then the display of Unchecked Statements adheres to the following scenario (when goals 1 and 4 are checked):

| Checked | Unchecked | Intelligent Agent Statement Displayed? |
|---|---|---|
| 1 | 2 | Y - Identify goal 2 as unchecked. |
| 4 | 2 | N - Goal 2 has already been identified via the above Unchecked Goal Statement. |

However, when goal 2 is checked, but neither goal 1 nor goal 4 is checked, the following holds true:

| Checked | Unchecked | Intelligent Agent Statement Displayed? |
|---|---|---|
| 2 | 1 | Y - Identify goal 1 as unchecked. |
| 2 | 4 | Y - Identify goal 4 as unchecked. |

Since the Intelligent Agent provides coaching on a user's selection of Wants and Needs, a possibility exists whereby disparate goals share the same piece of feedback, identified by a unique record number. In such instances, the coaching instance will be returned only once, displayed in sequence of its first occurrence.

Social Connection

Within the system, auto-connecting users, based on the percentage similarity of criteria they choose for a decision aid, facilitates collective intelligence; the method identifies users whom a user may not know, but who are decisioning within the same domain. In the current embodiment of the invention, algorithms are used to mathematically assign integer values to user selected criteria and level of importance, as integer attribution can be used to compare decision aids of multiple users and, more important, to flag those users who have decision aids with similarities (based on thresholds which may be administratively raised or lowered over time). Referring now to FIG. 18, there is shown the output table of an algorithm that can be used to mathematically assign integer values to users' preferences of a decision aid, resulting in the ability to compare decision aids and alert users of others who have decision aids with similarities in user preference.

In further detail, still referring to FIG. 18, 2801 and 2802 indicate that Need 1 ($N_1$), for example, for each user of a particular decision aid, has been assigned integer values corresponding to stated importance (as shown beneath the Value header, where 1 and 2 represent Less Important, and 3 and 4 represent More Important), as well as across underlying selection criteria, where 1 indicates user selection of that criteria, and 0 indicates disinterest of that criteria. These values are then compared to produce 2803, 2804 and 2805, which represent the similarity percentage per Want or Need, as well as the overall similarity between the decision aids of two users. This method results in a "Connect Me" function, whereby Social Media is exploited in a valuable manner; specifically, two users who do not know one another, but who are attempting to solve the same problem in a similar manner, are identified by the engine as potentially helpful to one another, as depicted in FIG. 18. The decision remains theirs as to whether or not they invite each other to view/comment on their decision aids.

Referring now to FIGS. 19 through 22, the formulas represented in Boolean terms are not intended to be specific to any particular programming syntax; nor are they presented as limitations of the invention. Rather, these formulas are presented as embodiments of calculations from which the system derives user relevancy and Intelligent Agent feedback. As example, in both Single-Product Domains and Multi-Product Domains, the states Not Important and More Important are used within Intelligent Agent feedback to coach the user toward selecting more criteria—when a majority of goals remain in the default state of Not Important—or to lessen the level of importance in cases where a majority of goals has been designated by the user as More Important. In these instances, example Intelligent Agent feedback reads as follows:

"You may want to reconsider the level of importance you assigned to criteria, as the majority are Not Important."

and

"You may want to reduce the level of importance you assigned to certain criteria, since the majority of your categories are More Important,"

Equations used to determine if either of the above conditions is true are represented in FIG. 20.

Now referring to FIGS. 21 and 22, the logic represented in FIG. 21 is referenced within FIG. 25; for FIG. 22, for each Single-Product Domain within the system, a 1:1 mapping aligns user-selected criteria with offerings of providers. Although exceptions violate this rule, all data that is used for comparative purposes is a 1:1 relationship. Offerings of each provider are entered via a Provider Input Form—a secure, web-accessed tool used by provider personnel (authors) to turn offerings on or off. Although the system's Content Management System captures this Provider Input Form data offline, the mapping of user-selected criteria to offerings occurs runtime. With Single-Product Domains, there are no equivalents to the Potential Relevant Products (PRP) set and Relevant Products (RP) subset as is the case within Multi-Product Domains. Unlike with Multi-Product Domains, results for Single-Product Domains are not determined based on ontological relationships—no neural network engine is invoked to produce the results; rather, offerings of each provider are evaluated against user-selected goals/queries using percentage-similarity formulas, enabled by the relationship, as stated above, of goals to products being 1:1, such that every goal has a corresponding offering; however, as also stated above, exceptions may violate this rule. In one embodiment of the present invention, an exception occurs for the fourth Need category within certain domains—called Future Needs. In these instances, providers are not evaluated against the Future Needs category; rather, goals in this category are solely used for coaching/pedagogical purposes. Within the Content Management System, and signaled via the Goal-to-Goal mapping method, goals within Future Needs that are complementary or contradictory to other goals are displayed for content authors to review, append and/or customize. When users select combinations of these goals, Intelligent Agent feedback is displayed, forewarning of contradiction, or emphasizing benefits of similarities, in effect, each provider within Single-Product Domains is a standalone set against which a user's selected goals are compared, via the percentage-based assessments and the devaluing algorithms displayed in FIG. 22. These comparisons are executed runtime, coinciding with user input.

In further detail, still referring to FIG. 22, display of results, in terms of relevancy to the user, differs between Single-Product Domains and Multi-Product Domains. Within Single-Product Domains of the system, pre-determined thresholds (for example, Resulting Fit>74%=Most Relevant), determine the display sequence of providers; the Resulting Fit threshold is applied only after devaluing tests are conducted for each provider. Single-Product Domains utilize categories of Most Relevant, Relevant and Of Interest. Single-Product Domains have Of Interest since, mathematically, certain providers may have questionable relevance to the user, but still offer the same conceptual product for which the user is searching. Since results within the system are returned based on percentage applicability—calculated per category initially, then devalued per category prior to determining an overall percentage applicability (which in itself my be devalued further—in cases where two results earn equal percentages, then they are displayed in order of assessment. Note that self-learning filters can affect this order, whereby if users access one result more frequently, then its display may be promoted. By putting contextual considerations into play, the system goes beyond item-by-item analysis, and is dissimilar to "inventory-based" faceted searches, delivering much more than a robotic matching of user-requested items to provider offerings. To achieve this degree of intelligence, different constructs are utilized, including Selected Criteria, Stated Importance, Provider Fit per Want/Need Category and Need vs. Want Consideration.

Algorithms within the system utilize these constructs in differing combinations to establish "context" as well as a coach's "frame-of-mind" (even if, from a Cognitive Load Theory point of view, a user is unaware of intricacies or repercussions inherent within the context). Via feedback provided by the Intelligent Agent, results "feel right" from a human-coaching point-of-view. The algorithm displayed in FIG. 22 devalues providers within Single-Product Domains according to rules that a real-world coach would apply.

Finally, still referring to FIG. 22, providers within Single-Product Domains are not penalized for providing more than what a user requests, only for providing less. The extreme of this case occurs when a user selects zero goals within a Want or Need category; in such cases, the provider's related category is set to 100% fulfillment. In all other cases, actual item-by-item comparison of offerings is conducted. In each instance where a provider's offering meets the user-requested Want or Need, that offering is set to true. Future rules are then applied, potentially devaluing the provider, before a final "fit" of Most Relevant, Relevant or Of Interest is reached.

Figure 23:
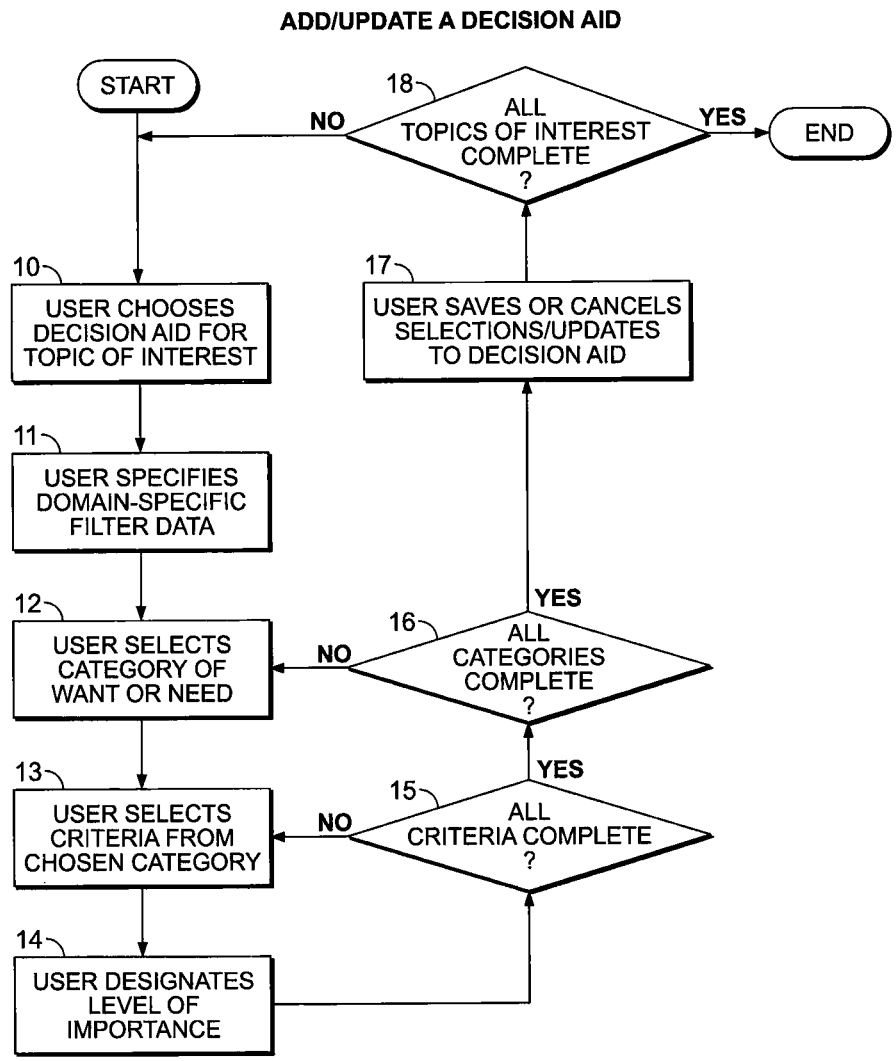
FIG. 23 is a flow chart depicting of the user action of accessing anew (adding) or updating a decision aid, which upon save, is displayed and stored within their member view of the website.

Flow charts illustrating operation of the above embodiment of the system of the invention are provided in FIGS. 23-32. FIG. 23 shows the user action of adding or updating a decision aid to the system, whereby 10 indicates that the user reviews a list of decision aids, each representing a particular subject matter and grouped within neighborhoods of content. In further detail, 11 indicates that the user provides domain-specific filtering criteria, such as search location, via checkbox, radio button, data entry field, drop down control or other input device common to user-interaction on the web. Within 12 is shown that the user selects among four Want categories and four Need categories, thereby establishing user intention within the subject matter area; 13 indicates that the user selects criteria of interest or self-relevance, then in 14 qualifies that choice by explicitly stating Level of Importance as Less important or More Important. Not Important remains the default for any unselected criteria. Still referring to FIG. 23, 15 and 16 indicate decision points for the user, allowing further self-representation of the decision aid by selecting among additional criteria within a Want or Need category, as well as selecting from Wants and Needs not yet assessed. Block 17 indicates the user's option to save to a member account or to cancel choices associated with the decision aid; and 18 indicates a decision point for the user, allowing further self-representation via subject matters for which additional decision aids are available through the system.

Figure 24:
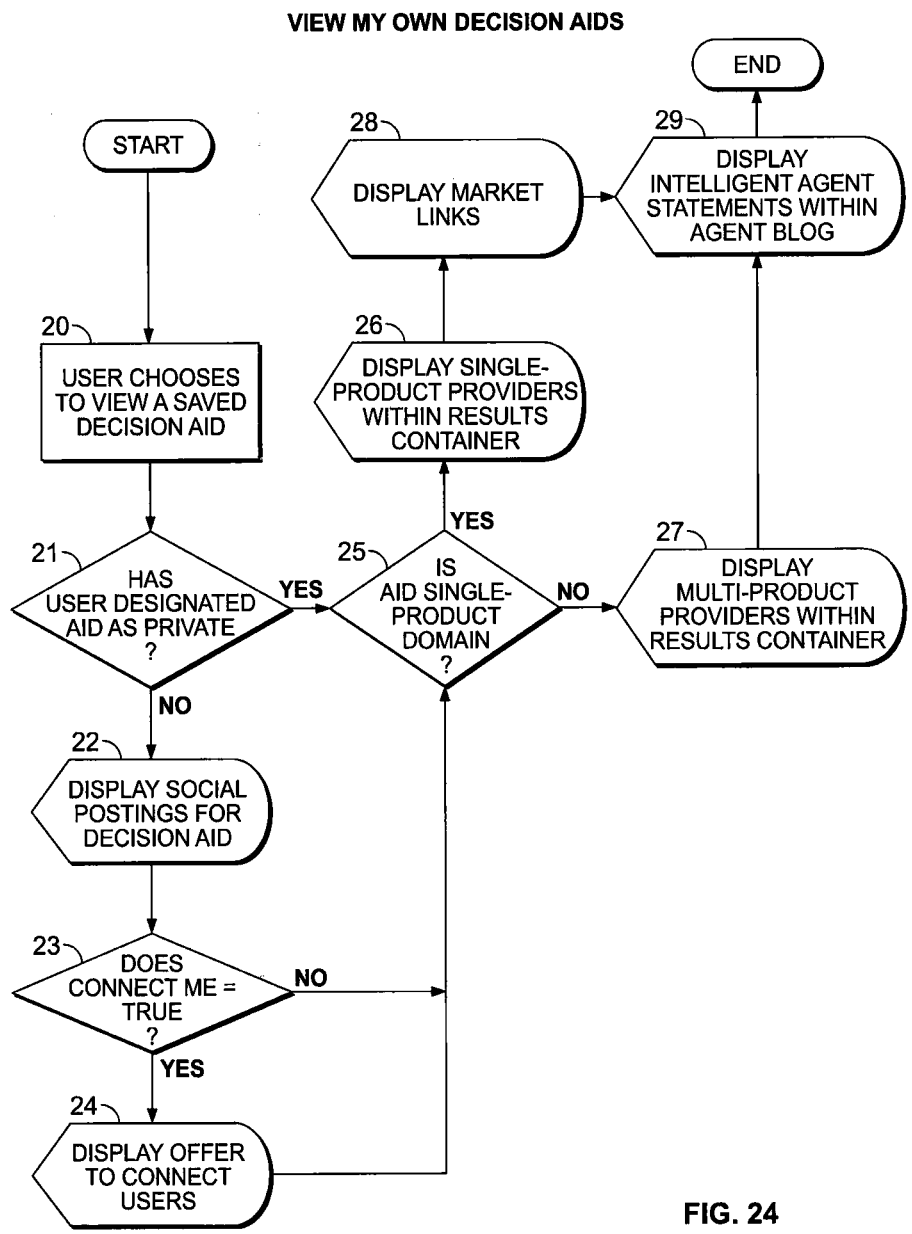
FIG. 24 is a flow chart depicting the user action of accessing a saved decision aid, with the purpose of i)

Referring now to FIG. 24, there is shown the user action of viewing system results based on user preferences defined in FIG. 23, in particular where 20 indicates the user action of choosing a decision aid from the set of 1 to m decision aids, where m is limited only by the instances of decision aids the user has added to their member account, since multiples of any single aid may exist within a member's account, effectively resulting in countless instances of decision aids. While viewing results, the user may consider intelligent feedback, eCommerce products and services, as well as collective intelligence provided by family and friends, the later only in those instances where the user has designated others with whom to share the decision aid, versus marking it private. To this end, still referring to FIG. 24, 21 tests whether the decision aid has been marked social or private, resulting in 22 if social, and 25 if private. Within the display of a social postings in 22, the test represented by 23 determines if users neither-specified-nor-potentially-known to the user have demonstrated threshold-based similarity in user preferences for the same decision aid; when true, 24 is displayed, offering to connect the user to similarly-minded users.

Still referring to FIG. 24, step 25 tests the domain-type of the decision aid, displaying Single-Product results in 26, and Multi-Product results in 27. Within 28 is shown the display of Market Links, which follow the display of 26 but not 27, since Multi-Product domains specifically do not contain Market Links. Finally, 29 displays a feature common to both types of domains: Intelligent Agent feedback provides coaching tailored to user preferences and to products deemed relevant to the user, and presented for user consideration.

As illustrated in FIG. 25, a series of tests are performed by the system to determine display of relevant content within Single-Product Domain containers. Step 30 indicates a user action to view a decision aid. Multi-Products Domains will always fail the test shown in 31, and will thereby result in 32, which is the display of Multi-Product Domain containers; otherwise, the test indicated by 33 queries a proprietary database for the presence of Single-Product Providers available to be displayed for user consideration. The subset of providers within 33 excludes those providers failing to meet geo-centric and other domain-specific filters provided by the user; in addition, the subset excludes content that Persona-type and machine-learning filters, as defined below, deem irrelevant to the user; all other providers are contained within the subset of 33, and therefore must be assessed for degree of relevancy to the user. To that end, continuing with the flow chart of FIG. 25, tests 34 and 36 determine whether the provider—via percentage similarity calculations applied against user preferences, an instance of which is described in FIG. 21, as well as devaluing methods, an instance of which is described in FIG. 22—is deemed Most Relevant or Relevant, then is displayed accordingly within 35 or 37; in instances where the tests 34 and 36 both prove false, the provider is displayed as Of Interest, shown in 38, since all providers within the 33 subset are to be shown.

Now referring to FIG. 26, step 40 indicates the user action of choosing to access either social postings—whereby family and friends have been granted permission to review and comment on the decision aid—or to access Intelligent Agent feedback contained within the agent's blog. When test 41 proves true, the system displays postings of those members invited to view the decision aid, shown in 42; when test 41 proves false, the user has chosen to view Intelligent Agent expertise for the decision aid, whereby in 43 through 48 the system determines then displays the appropriate context-rich content.

As illustrated in FIG. 27, a user establishes user profile data, thereby granting membership benefits to the user, such benefits including user ability to save decision aids for later access, to invite family and friends to review and comment upon certain decision aids, and to keep other decision aids private. Within 50 is shown the user action of accessing the profile editor; 51 tests if the user is signed-in as a member and, if true, captures profile updates in 55 and displays those updates in 56 for user confirmation. When 51 proves false, 52 requests that the user establish membership; the test shown in 53 validates the membership attempt, and if true, captures and displays remaining membership information in 55 and 56; otherwise, if false, 54 warns the users that decision aids can neither be saved nor shared without first establishing valid membership.

Referring now to FIG. 28, there is shown the user action of accessing a decision aid defined by another user, and for which permission to review & comment has been granted. In further detail, still referring to the embodiment of the invention of FIG. 28, 60 indicates that a user has selected—from the View Others' Decision Aids container identified in FIG. 2A, item 1203—to access another member's decision aid. 61 indicates the visual display of that decision aid's Wants and Needs, as well as its results, while 62 indicates that a Postings thread is displayed in the feedback container, rather than the Artificial Intelligent Agent's blog that is shown in FIG. 4A, item 1401. Still referring to FIG. 28, 65 and 66 respond to the user request to review Intelligent Agent feedback. Finally, within 63 is shown a test for the presence of similar users, resulting in 64 when true, which blocks the offer to connect to users since the current user is an invited viewer of the decision aid—versus the owner of the decision aid—and therefore does not have authority to grant view permission to other users.

Referring now to FIG. 29, there is shown the knowledge engineering process to create and map a Provider Input Form based on a decision aid, where the Provider Input Form enables providers a method for posting products and services. Such product and services may, through similarity matching algorithms for Single-Product Domains, or through ontological subset analyses for Multi-Product Domains, be deemed as relevant to user preferences within the decision aid. Integral to the function of FIG. 29 is a knowledge-mapped target domain, constructed via a knowledge acquisition process and populated via electronic forms or surveys, stored in proprietary database form, and having records within its search domain that reflect, either directly or through related products and services, the universe of potential user-specific criteria tied to Wants and Needs. In further detail, still referring to FIG. 29, 70 indicates the content engineer's decision of initiating a new Content Input Form based upon one of two proprietary templates; 71 and 72 indicate the content engineer's action of mapping a decision aid's four Want categories, four Need categories, and relevant underlying criteria into the Content Input Form for Single-Product Providers, who are to be evaluated as Most Relevant, Relevant or Of Interest based on user preference; 73 indicates the display of the newly defined Content input Form for Single-Product Providers. Items 74 through 76 represent the mapping and display of a Content input Form for Multi-Product Providers, whose offerings of 1:M products and services are to be evaluated against user preference, and whose offerings may be returned to the user either as Most Relevant or Relevant, since no Of Interest designation is associated with Multi-Product Providers.

Referring to FIG. 30, a method is shown for determining Intelligent Agent feedback to the user, specifically aligned with user-selected criteria and stated importance of each criteria. Intelligent Agent feedback triggers based on potentially relevant yet unchecked selections, as well as on the presence of contradictory, or complimentary selections within a decision aid, across decision aids, or from a Persona-type baseline, amassed by selections of other users demonstrating similarity in demographics and user preference. In further detail, still referring to FIG. 30, step 80 tests if selected criteria are to be assessed within or across decision aids; 81, 82, 86 and 87 determines the appropriate cross-decision aid or cross-user analyses; 83 through 86 and 88 determine the appropriate intra-user and intra-decision aid analyses; in each instance, the extracted Intelligent Agent feedback is displayed in 89. The method represented in FIG. 30 provides occurrences of semantic intelligence reflective of the user's selection criteria and stated importance; such feedback is delivered to the user with the purpose of refining potential results and assisting in better decision-making.

Referring now to FIG. 31, there is shown the method for visually indicating that a decision aid has been updated. The label for a decision aid is visually distinguished whenever Intelligent Agent feedback, social posting or eCommerce activity has occurred since the user last viewed the decision aid—whether that aid is the user's, or that of a family member or friend. In further detail, still referring to FIG. 31, 90 indicates the user action of opening a decision aid container—either View My Decision Aids or View Others' Decision Aids. Within 91 and 96 are shown system processes and queries to determine which decision aids have received updates, and to graphically highlight all in which the update test proves true.

Referring now to FIG. 32, there is shown the method for connecting two potentially unknown users, based on system-identification similarity for a decision aid that both users have included within their member accounts. In further detail, still referring to FIG. 32, 110, 120, 130 and 190 indicate an automated method for assigning integer values to user preferences within a decision aid; 140 and 150 indicate a system method and query to compare the values of two aids and determine if conditions are met such that the similarities are greater-than or equal-to an administrator-assigned threshold; when a true condition exists, 160 indicates that each of the two users will be given the opportunity to accept viewing the other's decision aid; 170, 180 represent a system query and method for cycling all decision aids through the comparison routine.

Referring now to FIG. 33-*a* through 33-*f*, example user interfaces are shown to convey a user's progress through major capabilities of the system. The renderings shown in FIG. 33-*a* and 33-*f* are common across Single-Product and Multi-Product Domains; those shown in FIG. 33-*b* through 33-*e* represent an embodiment of the Single-Product Domain, highlighting potential user actions.

Still referring to the series of interfaces of FIG. 33-*a* through 33-*f*, within FIG. 33-*a* a user selects among a list of domains, as shown in 3301. This walkthrough pursues a user-selected domain of "Explore Senior Living Facilities." In 3302 the user is shown to have established a user profile; as such, the user is later presented the option of saving the decision aid before exiting the "View Product Details" interface shown in FIG. 33-*c* through FIG. 33-*e*. By saving the decision aid, the user has future access to the decision aid via the "Manage My (Galaxy" container, shown in its closed state in 3303 of FIG. 33-*a*, and shown in its open state in 3316 of FIG. 33-*f*.

Now referring to FIG. 33-*b*, the interface for selecting criteria and level of importance for "Explore Senior Living Facilities" is displayed to the user. After entering filtering information such as location in 3304, then selecting family members and friends with whom the user wishes to share the decision aid in 3305, the user reviews criteria contained beneath four Want categories and four Need categories, shown in 3306 and 3307. As illustrated in 3307, the four Wants categories are Setting, Living Space, Lifestyle and Well Being, while the four Needs categories are Care, Medical, Financial and Future. While each decision aid contains exactly four Wants and four Needs, the number of criteria within each category depends on the topic, and may number from few to dozens or more. Criteria are authored in the form of attributes or goals, examples of which are shown below for "Explore Senior Living Facilities":

| Attribute style Criteria | Goal-style Criteria |
| --- | --- |
| Limited or no kitchen | Desire to age in place |
| Private Patio or balcony | Access to onsite medical care |
| 24 hour security | Maintain active lifestyle |
| Pets permitted | Minimize expenditure |
| Onsite medical facility | Maximize estate for heirs |
| Refundable entrance fee | Preserve financial security through known costs |

The user may change the criteria default state of "Not Important" to either "Less Important" or "More Important," or may choose to leave the criteria as "Not Important." As levels of importance are chosen for criteria, the bullseye graphic shown in 3307 automatically updates to display, in aggregate, the level of importance for each Want and Need category; in addition, levels of importance drive relevancy of results returned to the user, as described in relation to FIG. 22 and elsewhere. Once the user is satisfied with criteria selections and stated level of importance, the user may view intelligent Agent feedback and results relevant to the selections by clicking 3308 "View Results."

Now referring to FIG. 33-*c*, and still continuing the walkthrough of system interfaces, the user is presented with Intelligent Agent feedback in 3309. Feedback is triggered by user-specified criteria, and includes observations regarding criteria chosen of similar-nature, criteria chosen of contradictory-nature, and unchecked criteria that may be of value based on other user selections; additional feedback may include suggestions triggered by actions of similarly-minded users, as determined through the adaptive Persona Type method described with FIG. 7. Within 3310 the user may click "—Save" to store a piece of Intelligent Agent feedback within the member's profile, enabling quick access to the feedback, as shown in items 3316 and 3317 of FIG. 33-*f*. Still referring to the embodiment of the invention of FIG. 33-*c*, 3311 shows results returned to the user, grouped within categories of "Most Relevant," "Relevant," and "Of Interest." By selecting one of the results, the user is shown a detailed description of the result in FIG. 33-*d*, item 3312. From here, the user may choose to print the detailed result or, as shown in 3313, either i) save the result to the member's profile, or ii) share the result with designated family members and friends via the Postings container, shown in FIG. 33-*e*, item 3314. Once the user has reviewed Intelligent Agent feedback, relevant results and postings, the user may return to the main interface, which lists decision aids chosen and available to the user, by clicking the "Show Galaxy" icon in 3315.

Now referring to FIG. 33-*f* the "Manage My Galaxy" container within 3316 shows decision aids for which the user has chosen Wants and Needs, and for which the user has saved particular Intelligent Agent feedback and relevant results for quick access, as shown in 3317. Finally, the user of this walkthrough may choose to exit the system clicking "Sign out" in 3318.

While the preferred embodiments of the invention have been shown and described, it will be apparent to those skilled in the art that changes and modifications may be made therein without departing from the spirit of the invention, the scope of which is defined by the appended claims.

What is claimed is:

1. A system for aiding a user in making decisions with respect to products and services listed on the Internet comprising:
   a. a remote access device configured to permit the user to input data and review results;
   b. a server in communication with the remote access device and the Internet, said server programmed to:
      i) capture user preferences input through the remote access device, the user preferences comprising level of importance designations for a plurality of criteria within a plurality of categories for a single-product domain, wherein each category is classified as a want or a need, the level of importance designations being selectable by the user to designate each of the criteria in a manner that provides binary certainty, the binary certainty having a first test being whether each of the criteria is not important or has importance, and having a second test applicable to any criteria that has importance being whether each of the criteria is less important or more important;
      ii) calculate an overall stated importance for each category based on the level of importance designations for each of the criteria within the respective category;
      iii) return a set of single-product domain results, via a neural network engine, in an order determined by performing steps comprising:
         a) designating a degree-of-fit for a plurality of provider offerings of the single-product domain, the degree of fit being determined based on pre-determined but non-static fit percentage thresholds, and the degree of fit designation indicates whether each provider is most relevant, relevant, or less relevant;
         b) devaluing the degree-of-fit for any provider offering for which the percentage calculation for a category classified as a need is below a pre-determined need percentage threshold and the overall stated importance designation indicates high importance, such that a provider offering designated a Most Relevant status prior to devaluation is demoted to the status of Relevant, and a provider that designated as a Relevant status prior to devaluation is demoted the status of Of Interest;
      iv) return a set of multi-product domain results, via the neural network engine, in an order determined by performing steps comprising:
         a) defining the criteria selected by the user under the first test of the binary certainty as being user-selected criteria;
         b) mapping the user-selected criteria to a superset of products in an ontological schema of the system to produce a subset of potential relevant products, wherein the ontological schema is structured such that each criteria and each product are classified by a set of identifiers, and where there are instances of user-selected criteria having a set of identifiers that mathematically ensures a subset of the set of products is generated by the system;
      v) display the returned sets of provider results for the single-product domain and the multi-product domain on the remote access device.

2. A method for aiding a user in making decisions with respect to products and services listed on the Internet comprising:
   a. providing a remote access device configured to permit the user to input data and review results and a server in communication with the remote access device and the Internet;
   b. capturing user preferences on the server, the user preferences being input through the remote access device, the user preferences comprising level of importance designations for a plurality of criteria within a plurality of categories for a single-product domain, wherein each category is classified as a want or a need, the level of importance designations being selectable by the user to designate each of the criteria in a manner that provides binary certainty, the binary certainty having a first test being whether each of the criteria is not important or has importance, and having a second test applicable to any criteria that has importance being whether each of the criteria is less important or more important;
   c. calculating on the server an overall stated importance for each category based on the level of importance designations for each of the criteria within the respective category;
   d. returning a set of single-product domain results, via a neural network engine, in an order determined by performing steps comprising:
      i) designating a degree-of-fit for a plurality of provider offerings of the single-product domain, the degree of fit being determined based on pre-determined determined but non-static fit percentage thresholds, and the degree of fit designation indicates whether each provider is most relevant, relevant, or less relevant;
      ii) devaluing the degree-of-fit for any provider offering for which the percentage calculation for a category classified as a need is below a pre-determined need percentage threshold and the overall stated importance designation indicates high importance, such that a provider offering designated a Most Relevant status prior to devaluation is demoted to the status of Relevant, and a provider that designated as a Relevant status prior to devaluation is demoted the status of Of Interest;
   e. returning a set of multi-product domain results, via the neural network engine, in an order determined by performing steps comprising:
      i) defining the criteria selected by the user under the first test of the binary certainty as being user-selected criteria;
      ii) mapping the user-selected criteria to a superset of products in an ontological schema of the system to produce a subset of potential relevant products, wherein the ontological schema is structured such that each criteria and each product are classified by a set of identifiers, and where there are instances of user-selected criteria having a set of identifiers that mathematically ensures a subset of the set of products is generated by the system;
   f. displaying the returned sets of provider results for the single-product domain and the multi-product domain on the remote access device.

3. The system of claim 1, wherein the set of identifiers for each criteria selected by the user includes one intention, the intention being synonymous with one of the plurality of categories classified as a want or a need, and wherein the intention is a non-taxonomic construct within the ontology.

4. The system of claim 1, wherein:
   the set of identifiers for each product comprises constructs that include at least one super class, at least one class, at least one subclass, at least one intention, at least one attribute, and at least one sub-attribute; and the set of identifiers for each criteria selected by the user comprises constructs that include up to one super class, up to one class, up to one subclass, exactly one intention, exactly one attribute, and up to one sub-attribute.

5. The system of claim 1, wherein the ontological schema comprises a set of schematic relations (R) having constructs that are constant across domains such that a plurality of domains are satisfied by enforcing ontological mapping of criteria and products via a set of identifiers, and mapping requirements for each identifier, not by modifying the schematic relations (R) per domain (D).

6. The system of claim 5, wherein the constructs comprise: (i) super class, (ii) class, which is sub-ordinate to super class, (iii) subclass, which is sub-ordinate to class, (iv) intention, which is synonymous with the plurality of categories classified as a want or a need, and which is a non-taxonomic construct, (v) attribute, and (vi) sub-attribute, which is sub-ordinate to attribute.

* * * * *